United States Patent [19]
Matsufuji

[11] Patent Number: 5,669,479
[45] Date of Patent: Sep. 23, 1997

[54] OIL SUPPLY SYSTEM FOR WORKING VEHICLES

[75] Inventor: Mizuya Matsufuji, Sanda, Japan

[73] Assignee: Kanzaki Kokyukoki Mfg. Co., Ltd., Amagasaki, Japan

[21] Appl. No.: 616,619

[22] Filed: Mar. 15, 1996

[30] Foreign Application Priority Data

Apr. 4, 1995 [JP] Japan .................. 7-102998

[51] Int. Cl.[6] ............................................ F16D 25/10
[52] U.S. Cl. .................. 192/87.15; 192/87.18; 74/606 R; 184/6.12; 184/6.28
[58] Field of Search ................ 192/87.15, 87.18, 192/87.19; 74/606 R; 184/6.1, 6.12, 6.28

[56] References Cited

U.S. PATENT DOCUMENTS

| | | | |
|---|---|---|---|
| 2,505,450 | 4/1950 | Wemp | 192/87.15 X |
| 2,737,824 | 3/1956 | Livermore | 192/87.15 X |
| 3,017,006 | 1/1962 | Dence et al. | 192/87.15 X |
| 3,913,616 | 10/1975 | Horsch | 137/580 |
| 5,058,455 | 10/1991 | Nemoto et al. | 74/606 |
| 5,426,991 | 6/1995 | Ohkawa et al. | 74/606 R |
| 5,599,247 | 2/1997 | Matsufuji | 475/128 |

*Primary Examiner*—Andrea L. Pitts

[57] ABSTRACT

In a working vehicle in which a lower portion of the interior of the vehicle body is employed as an oil sump (49) for reserving oil supplied to oil-operated clutches (43F, 43R) by pump (48), an oil reservoir chamber (91) having an overflow opening (91a) is provided. The overflow opening is arranged such that the oil level (OLb) in the reservoir chamber is kept higher than the oil level (OL) in the sump due to overflow of oil from the chamber into the sump through the opening. Oil drain ports ($68T_1$, $68T_2$) of a control valve (68) for controlling the operation of the clutches are communicated into the reservoir chamber at a level lower than the oil level in the chamber. The intrusion of air into the valve and fluid passages connected thereto through the drain ports is prevented. Preferably, valve casing for the valve is fixedly supported by a housing (1) forming a part of the vehicle body and the reservoir chamber is defined between two casing members (56, 57) such that the overflow opening opens directly at the interior of the housing. (FIG. 5)

7 Claims, 13 Drawing Sheets

5,669,479

OIL SUPPLY SYSTEM FOR WORKING VEHICLES

FIELD OF THE INVENTION

This invention relates to an oil supply system adapted for use in a working vehicle, such as a tractor, in which a lower portion of the vehicle body is employed as an oil sump for reserving oil which is supplied to oil-operated means, such as oil-operated clutch means, by an oil pump.

BACKGROUND OF THE INVENTION

In a working vehicle such as a tractor, various oil-operated means such as oil-operated clutches, an oil-operated brake and the like are often provided. In such a working vehicle, a lower portion of the vehicle body in which transmission mechanisms are housed is generally used as an oil sump for reserving oil supplied to the oil-operated means by an oil pump. Oil within the oil sump serves also as lubricant for lubricating the transmission mechanisms. In a tractor or similar working vehicle having an axially lengthy vehicle body, oil is generally fed to the oil pump from the interior of a rear end portion of the vehicle body, which portion is at a lower position of the vehicle when the vehicle climbs up a slope, for preventing shortage or interruption of the supply of oil when the vehicle is climbing up a slope. For example, U.S. Pat. No. 5,058,455 discloses an oil supply structure for a tractor which includes plural oil-operated clutches incorporated in a vehicle speed-change transmission and an oil-operated power take-off clutch incorporated in the implement-driving power take-off line. The oil supply structure comprises a filter which is disposed in a lower portion within a rear housing constituting a rearmost portion of the vehicle body and through which oil is fed to an oil pump.

Control valves, such as a directional control valve for controlling the supply of oil to hydraulic cylinders or oil-operated clutches and a control valve for controlling some operation of a relief valve for establishing oil pressure applied to hydraulic cylinders or oil-operated clutches, are generally disposed on an outer surface of the vehicle body or at the inside of the vehicle body such that oil drain ports of these control valves open directly at the inside of the vehicle body so that oil drained from the valves is returned into the oil sump defined by a lower portion of the vehicle body. In a vehicle in which control valves are arranged at a high level, for example, on an upper surface of the vehicle body, oil drain ports thus open into air above the oil sump. Even in a vehicle in which control valves are arranged at a low level on a sidewall of the vehicle body or within the vehicle body, oil drain ports are often located at a level above the oil sump when the vehicle is on a slope.

It has been found that oil-operated means provided in such a vehicle sometimes fail to operate as expected due to the mixing of air into oil. For example, a modulating relief valve is often employed, as a relief valve for establishing oil pressure, in order to attain a schock-free starting operation of an oil-operated clutch or the like. Such a modulating relief valve comprises a control piston which receives the base end of an oil pressure-establishing spring, and an oil chamber which is defined at a location behind the control piston and is adapted to be supplied with clutch-operating oil through an orifice. When a directional control valve has been displaced to an operative position for supplying oil to the clutch, the control piston is gradually advanced by oil supplied into the oil chamber gradually through the orifice so that the force of the pressure-establishing spring is gradually hightened whereby oil pressure applied to the clutch is gradually increased. When the directional control valve has been returned to its neutral position and the clutch has been disengaged, it is necessary to drain oil quickly from the oil chamber preparing for the next operation of the clutch or for the operation of another clutch of a speed change mechanism. In a structure in which a control valve is provided for selectively connecting the oil chamber to the oil sump for a quick drain of oil and in which the oil drain port of such control valve opens into air, air will intrude via this control valve, after the oil has been drained, into oil passages connected thereto and into the oil chamber. When this is the case, oil mixed with air may be supplied into the oil chamber during the next oil pressure-establishing operation of the modulating relief valve, resulting in a considerable delay in the pressure-establishing operation of this relief valve. Such a delay in the operation of the modulating relief valve will cause a delay in the engaging operation of an oil-operated clutch incorporated in, for example, a vehicle-drive power transmission line, which in turn may cause a considerable delay in the start of the vehicle.

In a case where a directional control valve for controlling the supply of oil to an oil-operated clutch or the like includes an oil drain port which opens into air, air may intrude, at the neutral position of the control valve, into this valve and into fluid passages connected thereto. When the directional control valve is then displaced to an operative position, air-mixed oil may be supplied to the clutch. This may cause a delay in the operation of the clutch or uneven wearing of frictional elements of the clutch due to uneven force applied to the elements.

Additionally, air-mixed oil is apt to generate noise or to prevent a precise control of oil pressure as in the case of cavitation or areation.

Accordingly, a primary object of the present invention is to provide a novel oil supply system which prevents the mixing of air into oil in a working vehicle in which a lower portion of the interior of the vehicle body is used as an oil sump.

An attendant object is to provide an oil supply system in which the prevention of the mixing of air into oil is attained by a very simple structure.

SUMMARY OF THE INVENTION

The present invention relates to an oil supply system for a working vehicle which comprises a vehicle body, oil-operated means, an oil pump for supplying oil to the oil-operated means, and a control valve means for controlling the operation of the oil-operated means. A lower portion of the interior of the vehicle body is employed as an oil sump for reserving oil which is supplied to the oil-operated means by the oil pump.

In accordance with the present invention, an oil reservoir chamber (91) is provided and has an overflow opening (91a) which is arranged such that the oil level in the oil reservoir chamber is kept higher than the oil level in the oil sump (49) due to the overflow of oil from the reservoir chamber into the oil sump through the overflow opening. Further, an oil-drain port ($68T_1$; $68T_2$) of the control valve means (68) is communicated into the oil reservoir chamber (91) at a level lower than the oil level in the oil reservoir chamber.

According to the present invention, oil drained from the oil drain port ($68T_1$; $68T_2$) of the control valve means (68) is once discharged into the oil reservoir chamber (91) at a location below the oil level in the chamber which level is kept higher than the oil level in the oil sump (49) within the vehicle body, and then is returned into the sump through overflow. Consequently, so far as the overflow opening (91a) of the oil reservoir chamber is placed at an appropriate level, there is no chance that the oil drain port of the control valve means is exposed to air. The intrusion of air via the drain port into the control valve means and into fluid passages connected thereto is thus prevented with certainty.

In an embodiment of the present invention in which the oil-operated means is at least one oil-operated clutch (43F, 43R), a modulating relief valve (76) for gradually increasing oil pressure applied to the clutch is provided and comprises a control piston (87), which receives a base end of an oil pressure-establishing spring (86), and an oil chamber (88) which is defined at a location behind the control piston and is adapted to be supplied with clutch-operating oil through an orifice (89). The control valve means is fashioned into a control valve (68) for selectively connecting the oil chamber (88) to the oil sump (49) and thereby draining oil quickly from the chamber. According to this structure, there is no room, after oil has been drained quickly from the oil chamber (88), for air to intrude through the oil drain port of the control valve (68). Consequently, when the clutch (43F, 43R) is then operated, the modulating relief valve (76) will not cause a delay in the operation of the clutch, which may be caused when air-mixed oil is supplied to the oil chamber (88), although the relief valve operates to increase the oil pressure applied to the clutch gradually and to thereby attain a shock-free engagement of the clutch.

In another embodiment of the present invention, the oil-operated means is at least one oil-operated clutch (43F, 43R) while the control valve means is a directional control valve (68) for controlling the supply of oil to the clutch (43F, 43R). According to this structure, there is no room for air to intrude through the oil drain port of the directional control valve (68) at the neutral position of this control valve. Consequently, when the directional control valve (68) is operated again so as to re-engage the clutch or so as to engage another oil-operated clutch, problems resulting from the clutch operation by means of air-mixed oil, such as uneven wearing of the frictional elements of the clutch, will be resolved.

When a modulating relief valve (76) for gradually increasing oil pressure applied to the clutch (43F, 43R) is additionally provided, the directional control valve (68) is preferably fashioned, for simplifying the structure of the oil supply system, such that the directional control valve is operable at its neutral position to connect the oil chamber (88) of the modulating relief valve (76) to the oil sump (49) for draining oil quickly from the oil chamber.

In a structure in which a plurality of oil-operated clutches (43F, 43R) are provided, as the oil-operated clutches described above, and are adapted to be operated selectively one at a time for a speed-change purpose, a delay in the vehicle start resulting from a delay in the operation of the modulating relief valve (76) as well as problems resulting from the clutch operation by means of air-mixed oil, such as uneven wearing of the frictional elements of the clutch, are both eliminated.

For providing the oil reservoir chamber (91) in a simple fashion, it is preferred that a valve casing (56, 57, 58, 59) for the control valve means (68) is fixedly supported by a housing (1) which constitutes a part of the vehicle body and that the oil-reservoir chamber (91) is defined within the valve casing such that the overflow opening (91a) thereof opens directly at the interior of the housing (1).

For further simplifying the structure, the valve casing (56, 57, 58, 59) preferably includes two casing members (56, 57) which are joined together such that the oil reservoir chamber (91) is defined between these two casing members. Such an oil reservoir chamber (91) can be provided simply by covering the open end of a recess formed in a surface of one of the casing members with the other casing member.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
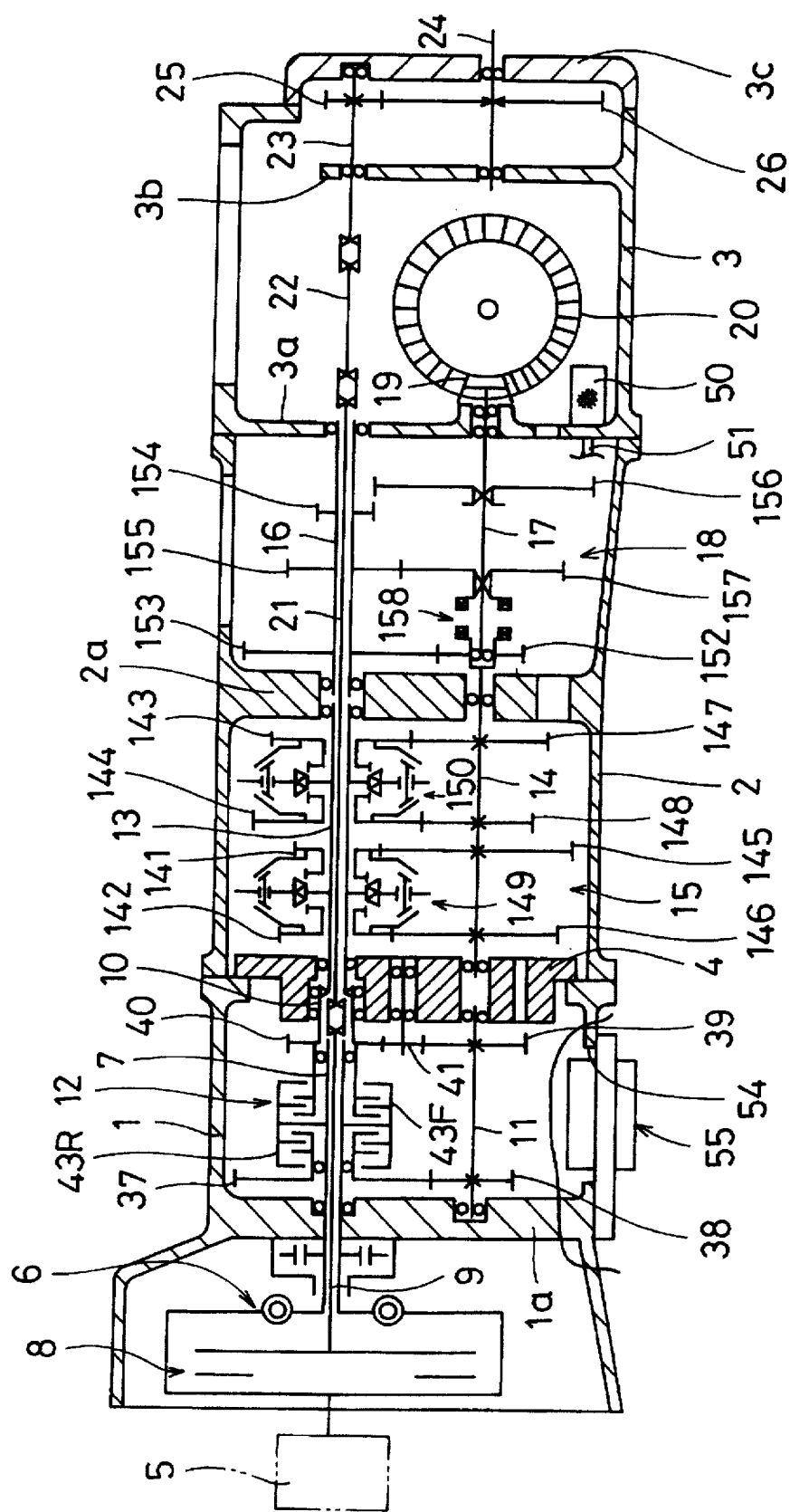
FIG. 1 is a schematic sectional side view, partially developed, showing the whole of transmission system in a tractor in which a preferred embodiment of the oil supply system according to the present invention is employed.
Figure 2:
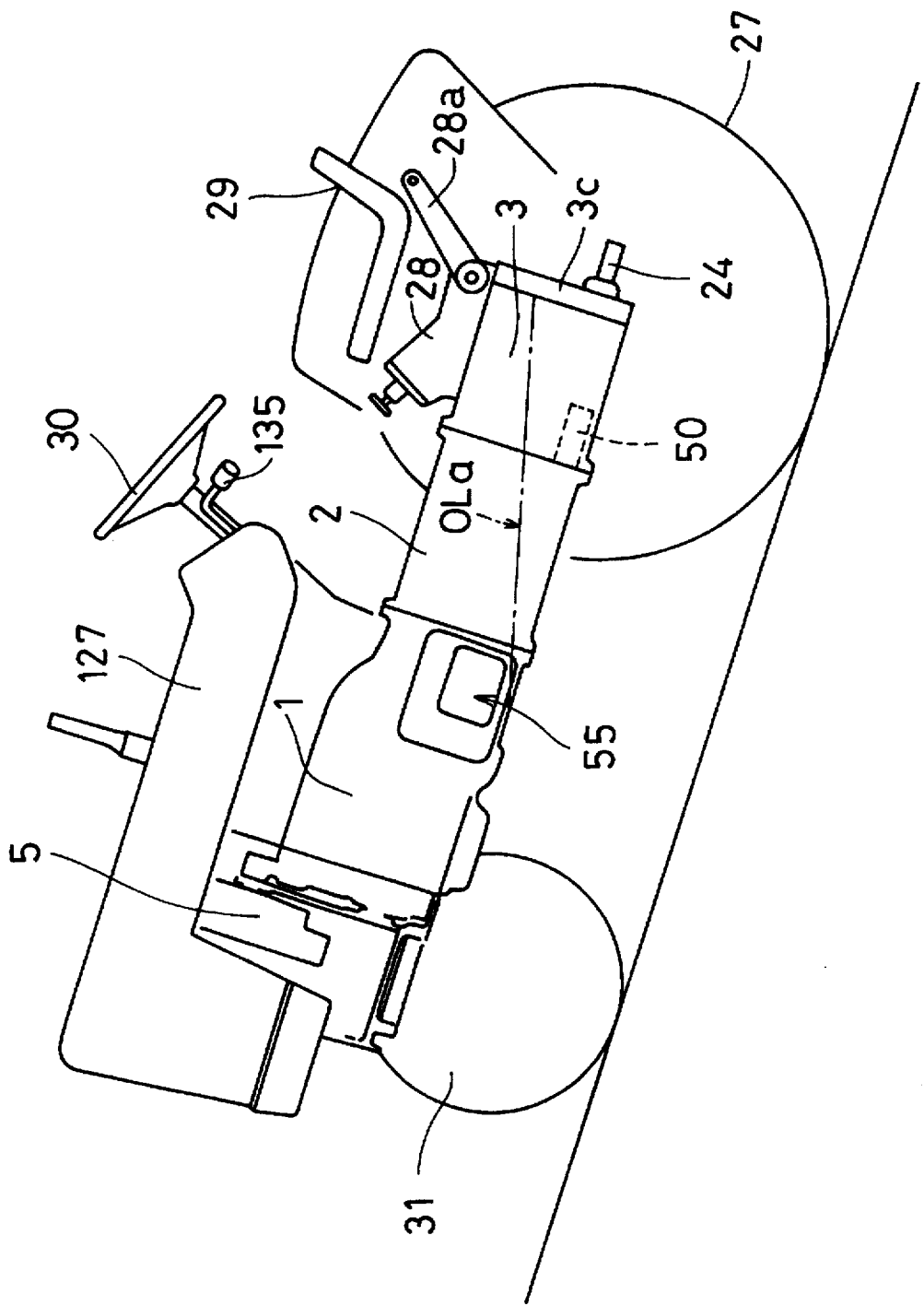
FIG. 2 is a schematic side view of the tractor shown in FIG. 1, illustrating a condition where the tractor is on a slope.

FIG. 1 shows schematically the whole of the transmission system of a tractor in which a preferred embodiment of the present invention is employed, and FIG. 2 shows schematically a condition where the tractor is on a slope. As shown in these figures, the vehicle body of the tractor shown is composed of a front housing 1, transmission casing 2 and rear housing 3 which are arranged in series in a longitudinal direction of the tractor and are fastened together. Engine 5 is mounted on a frontmost portion of the tractor.

As shown in FIG. 1, front housing 1 includes an open front end, an open rear end and an internal partition wall 1a. A bearing support frame 4, which is fixedly secured to the front housing 1, is disposed within a rear end portion of this housing 1. Transmission casing 2 includes an open front end, an open rear end and an internal support wall 2a. Rear housing 3 includes a front wall 3a, an internal support wall 3b which upstands from the inner bottom of this housing 3, and an open rear end which is closed by a rear end cover 3c.

As also shown in FIG. 1, there are disposed within the front housing 1 a hollow primary shaft 7 of the vehicle drive-power transmission line, which is driven to rotate by engine 5 through a cushion spring mechanism 6, and a primary shaft 9 of the power take-off transmission line which is driven to rotate by engine 5 through a power take-off clutch 8. The primary shaft 7 of the vehicle drive-power transmission line extends axially of the vehicle through the partition wall 1a, and the primary shaft 9 of the power take-off transmission line extends through the hollow primary shaft 7. There are disposed also within the front housing 1 a hollow output shaft 10, which is located behind and co-axially with the primary shaft 7 and is supported by the bearing support frame 4, and an intermediate shaft 11 which is located below the shafts 7 and 10 and is supported by the partition wall 1a and by the bearing support frame 4. An additional speed change mechanism 12 is disposed within the front housing 1 and behind the partition wall 1a such that it performs a speed change transmission between the primary shaft 7 and the output shaft 10.

A hollow drive shaft 13 at a high level and a speed change shaft 14 at a low level are disposed within the transmission casing 2 and are supported by the bearing support frame 4 and by the support wall 2a, respectively. The drive shaft 13 is coupled to the output shaft 10 at a location within the support frame 4. Within a front half of the transmission casing 2, a primary speed change mechanism 15 is disposed and is operable to perform a speed change transmission between the drive shaft 13 and the change shaft 14.

Within a rear half of the transmission casing 2, there are disposed a hollow intermediate shaft 16 which is located behind and co-axially with the drive shaft 13, a propeller shaft 17 which is located behind and co-axially with the change shaft 14, and an auxiliary speed change mechanism 18 which is operable to perform a speed change transmission between the change shaft 14 and the propeller shaft 17. Propeller shaft 17 extends into the rear housing 3 and has, at its rear end, a small bevel gear 19 which is meshed with a larger input bevel gear 20 of a differential gearing (not shown) for left and right rear wheels so that the vehicle is driven to move by the drive of the left and right rear wheels 27 one of which is shown in FIG. 2.

The primary shaft 9 of the power take-off line is connected to a transmission shaft 21 which extends through the hollow drive shaft 13 and intermediate shaft 16, and then to two transmission shafts 22 and 23 which are disposed in series within the rear housing 3. A PTO shaft 24, which is driven to rotate by the transmission shaft 23 through speed-reduction meshing gears 25 and 26, is supported by the support wall 3b and by the rear end cover 3c and extends rearwardly of the vehicle body.

As shown in FIG. 2, a hydraulic lift mechanism 28 having a pair of left and right lift arms 28a is mounted on an upper surface of the rear housing 3. This lift mechanism is operable to lift and lower an auxiliary implement (not shown), such as a rotary tiller, which is drawn by the tractor and is driven by the PTO shaft 24. Seat 29 is disposed at a location above the hydraulic lift mechanism 28. A steering wheel 30 is arranged before the seat 29 for steering the tractor by providing steering turns to left and right front wheels 31.

Figure 3:
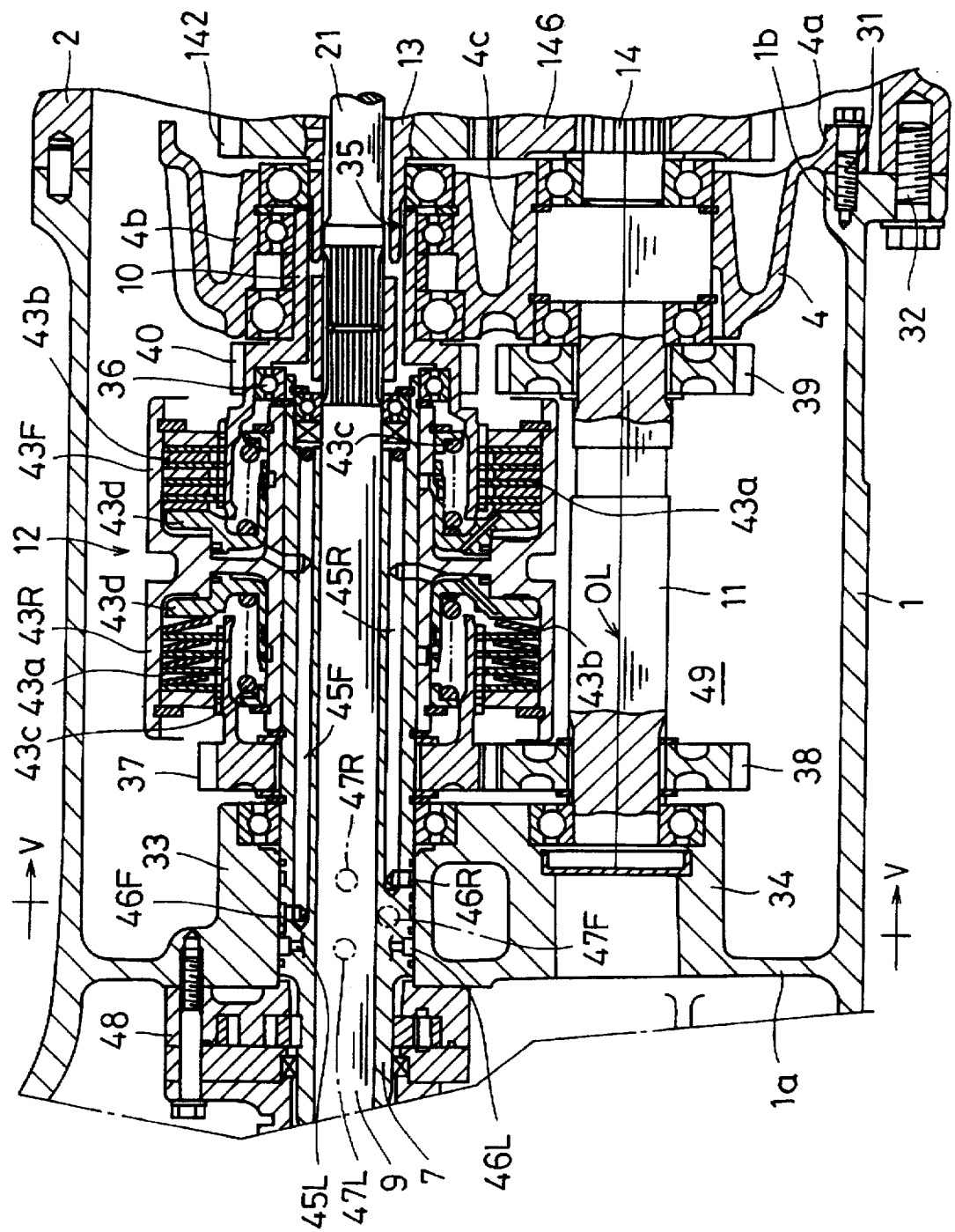
FIG. 3 is a sectional side view showing a rear half of a front housing shown in FIGS. 1 and 2.
Figure 4:
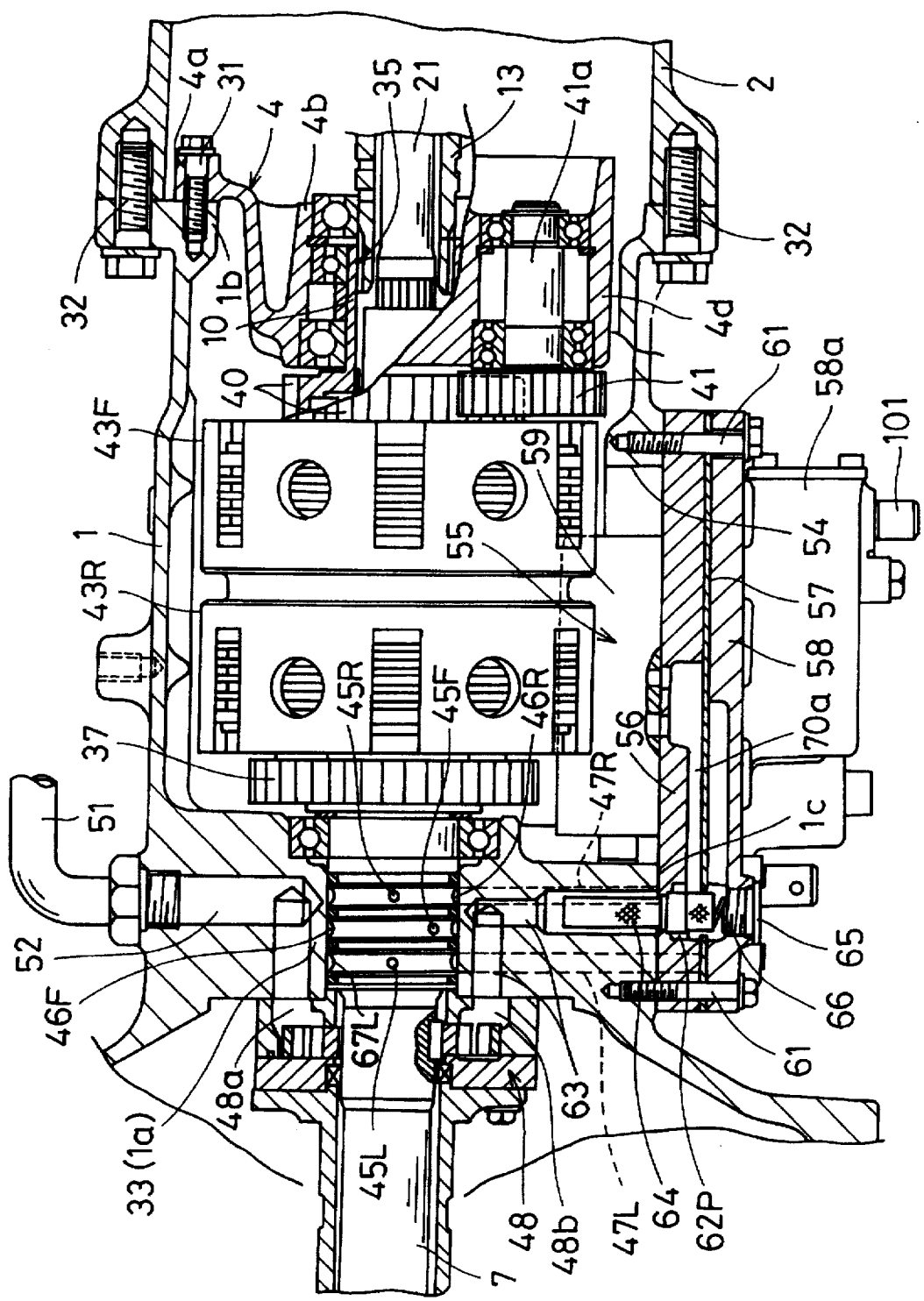
FIG. 4 is a sectional plane view showing the rear half of the front housing.

The additional speed change mechanism 12 will be detailed by referring to FIGS. 3 and 4 which depict a rear half of the front housing 1, respectively. The bearing support frame 4 is shaped such that this frame has, at its rearmost outer periphery, plural projections 4a which are adapted to abut, from the side of the transmission casing 2, against bosses 1b which are projected inwardly from the inner surface of a rear end portion of the front housing 1. Bolts 31 extend through projections 4a and are threadingly engaged with bosses 1b so as to secure the support frame 4 to the rear of the housing 1. The front housing 1 and transmission casing 2 are fastened together at their outer flanged portions using bolts 32 which are threadingly engaged with the casing 2 from the side of front housing 1.

As also shown in FIGS. 3 and 4, the primary shaft 7 is shaped such that it includes an outer diameter-enlarged rear half having its front end at an axial location nearly equal to that of the front surface of the partition wall 1a. A thickened hollow cylindrical portion 33 for receiving a front end portion of the diameter-enlarged rear half of the primary shaft 7 is formed integrally in the partition wall 1a. Another thickened hollow cylindrical portion 34, which is integrally connected with the former cylindrical portion 33, is also formed in the partition wall 1a such that this portion 34 is located in front of the intermediate shaft 11. The bearing support frame 4 is further shaped such that it includes upper and lower hollow cylindrical support portions 4b and 4c and another hollow cylindrical support portion 4d at a mid level. An axially mid portion of the primary shaft 7 and a front end portion of the intermediate shaft 11 are supported respectively by the partition wall 1a through ball bearings which are held respectively by rear end portions of the cylindrical portions 33 and 34. Output shaft 10 is supported by the upper cylindrical support portion 4b of the support frame 4 through a pair of ball bearings. A front end portion of the drive shaft 13, which is coupled to the output shaft 10 by a spline connection 35, is also supported by the cylindrical support portion 4b through a ball bearing. A rear end portion of the intermediate shaft 11 and a front end portion of the change shaft 14 are supported respectively by the lower cylindrical support portion 4c of the support frame 4 through ball bearings. A rear end portion of the primary shaft 7 is supported by the output shaft 10 through a ball bearing 36 so that this end portion of shaft 7 is supported by the frame 4 through output shaft 10.

The additional speed change mechanism 12 includes a first gear 37 which is rotatably mounted on the primary shaft 7, a second gear 38 which is fixedly mounted on the intermediate shaft 11 and is meshed with the first gear 37, a third gear 39 which is fixedly mounted on the intermediate shaft 11, a fourth gear 40 which is formed integrally with the output shaft 10 at its foremost end, and an idler gear 41 which is supported at its integral shaft portion 41a by the cylindrical support portion 4d through ball bearings and is meshed with both of the third and fourth gears 39 and 40.

On the primary shaft 7, there are mounted all oil-operated clutch 43R for coupling the first gear 37 selectively to the primary shaft 7 and another oil-operated clutch 43F for coupling the fourth gear 40 selectively to the primary shaft. A clutch cylinder common to these clutches 43F and 43R is fixedly mounted on the primary shaft 7. Boss portions of the gears 37 and 40 include extentions which extend respectively into the clutch cylinder. Each of the oil-operated clutches 43F and 43R is fashioned into a frictional multi-disc type comprising alternately arranged frictional discs 43a and steel discs 43b which are slidably but non-rotatably supported respectively by each of the extensions and by the clutch cylinder. Each of the steel discs 43b is cone-shaped as shown with respect to the clutch 43R. In an engaged condition of each clutch, these steel discs 43b are flattened as shown with respect to the clutch 43F. As is conventional, each of the clutches 43F and 43R includes a piston 43d which is biased to move toward a direction of disengaging the clutch by a return spring 43c. When a clutch-operating oil pressure is applied to the piston 43d, discs 43a and 43b are engaged frictionally whereby the clutch is engaged as shown with respect to the clutch 43F. The additional speed change mechanism 12 shown is designed as a direction-reversing type in which the output shaft 10 is given a forward directional rotation when the clutch 43F is engaged so as to couple the fourth gear 40 and, therefore, shaft 10 directly to the primary shaft 7, whereas the output shaft is given a backward directional rotation when the clutch 43R is engaged so as to couple the first gear 37 to the primary shaft 7 and to thereby connect the output shaft 10 to shaft 7 through gears 37, 38, 39, 41 and 40. Alternatively, the additional speed change mechanism may be designed as a high/low speed-selector type in which the idler gear 41 shown is omitted and the third and fourth gears 39 and 40 shown are meshed directly with each other.

For supplying operating oil to the clutches 43F and 43R, clutch-operating oil passages 45F and 45R are formed ill the primary shaft 7 and are in fluid communication with the clutches. The primary shaft 7 further includes in it a lubricant passage 45L for supplying lubricant oil to the clutch discs 43a and 43b. Three annular oil chambers 46F, 46R and 46L are defined between the primary shaft 7 and the hollow cylindrical portion 33 of partition wall 1a by sealing three annular grooves in the outer circumference of shaft 7 by means of the inner circumference of cylindrical portion 33. Clutch-operating oil passages 45F and 45R in the primary shaft are communicated respectively with the annular oil chambers 46F and 46R, and lubricant passage 45L in the primary shaft is communicated with the annular oil chamber 46L. Tile partition wall 1a includes, in its thickened portion adjacent to the cylindrical portion 33, laterally extending clutch-operating oil passages 47F and 47R and lubricant passage 47L which open at their one ends respectively at the annular oil chambers 46F, 46R and 46L.

As also shown in FIGS. 3 and 4, oil pump for supplying clutch-operating oil to the clutches 43F and 43R is fashioned into an internal gear pump 48 by employing the primary shaft 7 as its pump shaft and is mounted oil a front surface of the partition wall 1a. A lower space within a rear half of the front housing 1 behind the partition wall 1a and lower spaces within the transmission casing 2 and rear housing 3 are filled with oil which is supplied to the clutches 43F and 43R by the operation of the pump 48. Thus, a lower portion of the interior of the vehicle body is employed as an oil sump 49 shown in FIGS. 3 and 5. As schematically shown in FIG. 1, the bearing support frame 4, the support wall 2a of the transmission casing 2 and the front wall 3a of the rear housing 3 include, at their lower portions, communicating bores allowing oil to pass therethrough unrestrictedly so that the whole of the oil sump 49 has a common oil level OL shown in FIGS. 3 and 5. When the vehicle is on a slope and takes an inclined posture having its front end at the topmost position, as shown in FIG. 2, the oil level is varied to a level OLa shown in phantom such that the depth of the oil sump 49 is larger at the side of the rear housing 3 than at the side of the front housing 1. For avoiding interruption of the oil supply when the vehicle is climbing up a slope, it is designed that the oil pump 48 is fed with oil from the interior of the rear housing 3. As schematically shown in FIGS. 1 and 2, an oil filter 50 is mounted on a rear surface of the front wall 3a and is disposed within the rear housing 3. An oil-feeding pipe 51 is connected to the filter 50 and has an end which is located, as shown in FIG. 4, at the outer surface of a sidewall of the front housing 1. A suction passage 52, which is formed within the partition wall 1a, connects between the pipe 51 and a suction port 48a of the pump 48.

Figure 5:
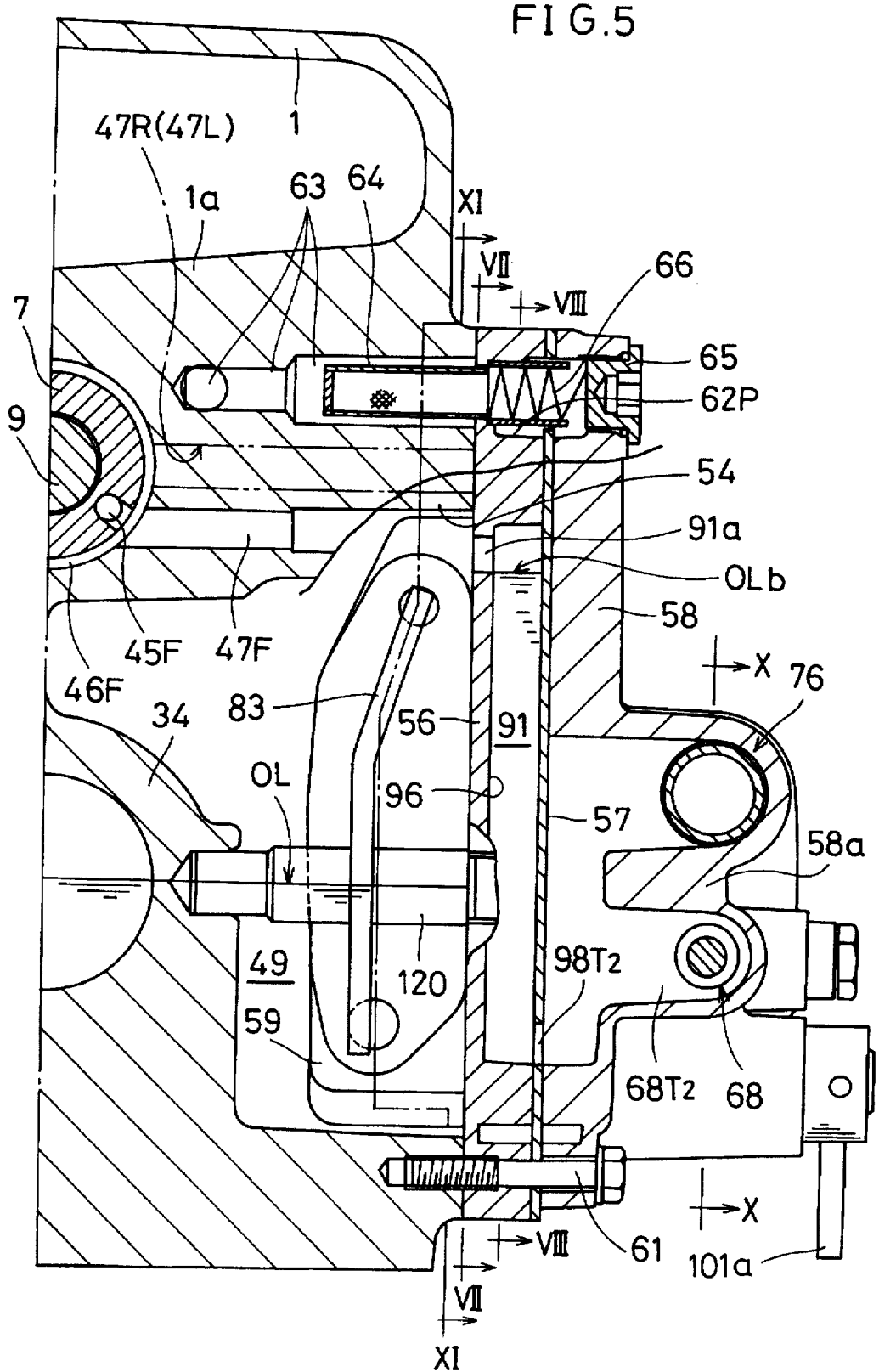
FIG. 5 is an enlarged sectional view, partially omitted, taken generally along line V—V of FIG. 3.
Figure 6:
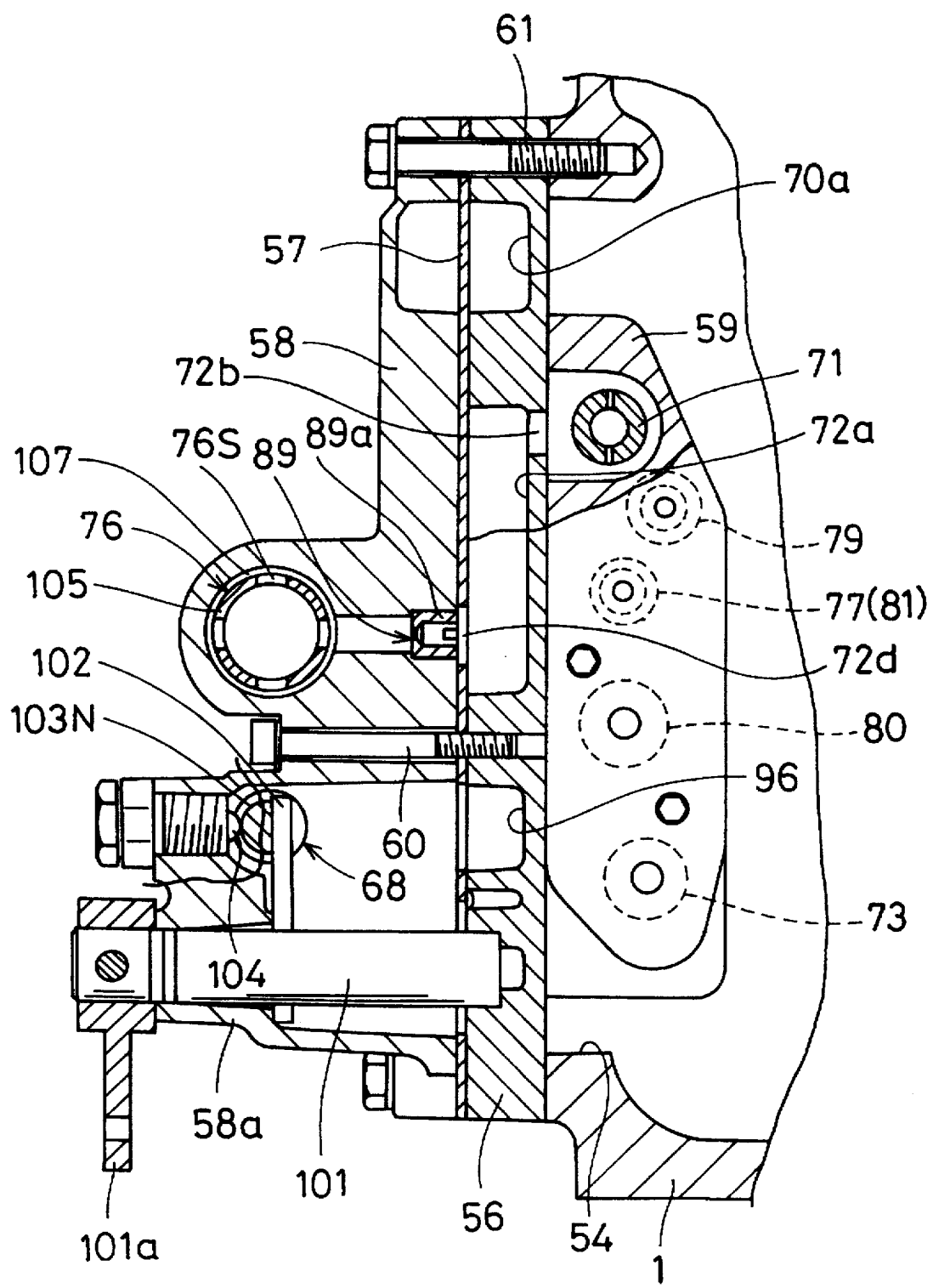
FIG. 6 is a sectional rear view of the part shown in FIG. 5.
Figure 7:
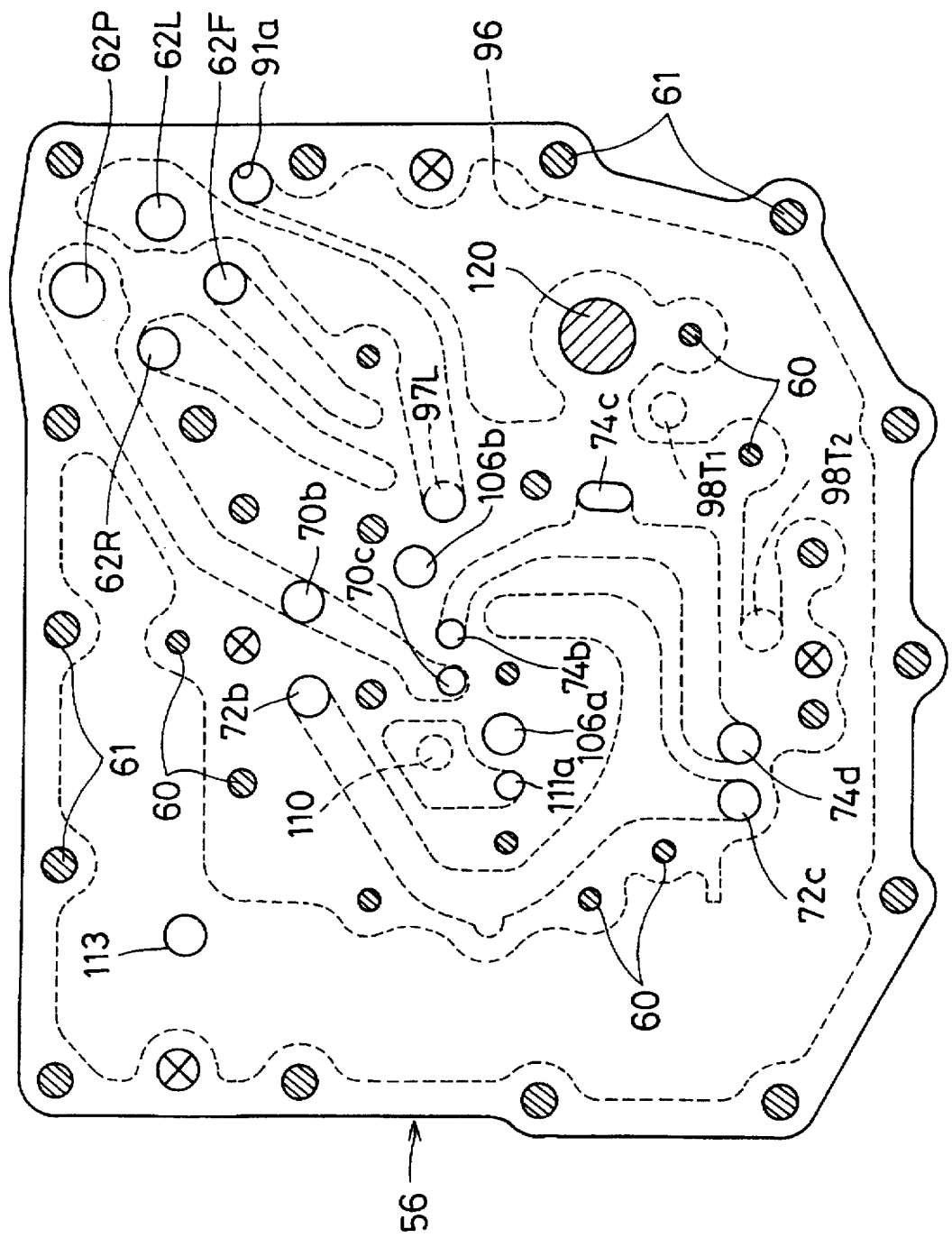
FIG. 7 is a sectional view taken generally along line VII—VII of FIG. 5.
Figure 8:
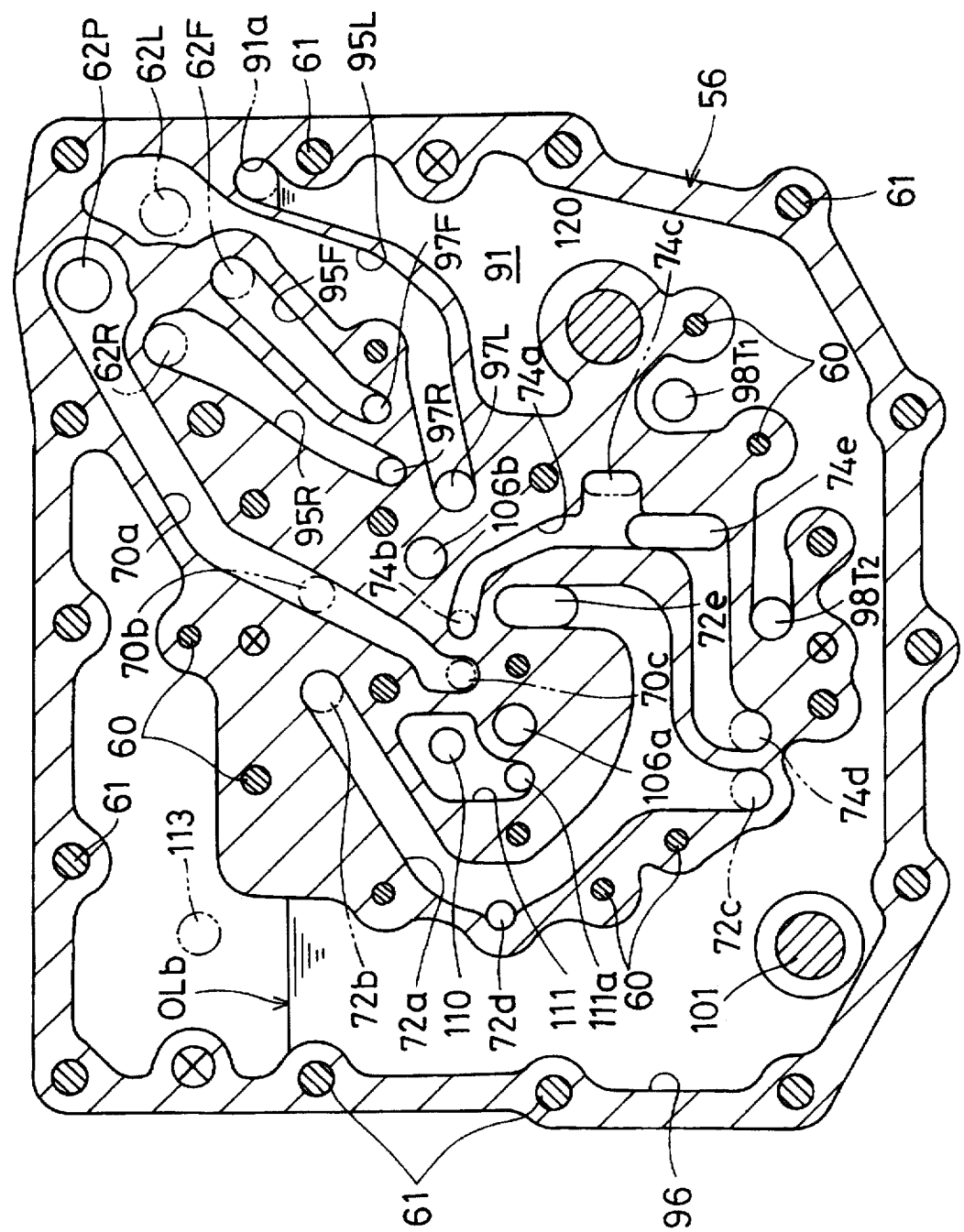
FIG. 8 is a sectional view taken generally along line VIII—VIII of FIG. 5.

As shown in FIGS. 4 to 7, the other sidewall of the front housing 1 includes, at a location behind the partition wall 1a,
an opening 54. A control valve assembly 55 for controlling the operation of the additional speed change mechanism 12 extends through this opening 54 and is fixedly supported by the front housing 1. The valve assembly 55 comprises a valve casing composed of a plate member 56 which is disposed on an outer surface 1c of the sidewall set forth above, an outer casing member 58 which is disposed on an outer surface of the plate member 56 with a thin partition plate 57 sandwiched therebetween, and an inner casing member 59 which is disposed on an inner surface of the plate member 56 and is located within the front housing 1. These members are fastened together using bolts 60, and the valve casing is fixedly secured to the front housing using bolts 61. As shown in FIGS. 7 and 8, the plate member 56 includes an oil inlet port 62P, two operating oil outlet ports 62F and 62R and a lubricant outlet port 62L all of which open at an outer surface 1c of the sidewall of the front housing 1. Of these ports, the outlet ports 62F, 62R and 62L are communicated, as shown in FIGS. 4 and 5, directly to the operating oil passages 47F, 47R and lubricant passage 47L which extend straight within the partition wall 1a and open at the surface 1c, respectively.

As shown in FIGS. 4 and 5, the partition wall 1a further includes a discharge passage 63 which communicates, at its one end, with a discharge port 48b of the oil pump 48. This discharge passage 63 has the other end which is faced to the oil inlet port 62P. A bore, which opens at an outer surface of the outer casing member 58, extends through the plate member 56, partition plate 57 and outer casing member 58 such that the oil inlet port 62P is provided by an inner end portion of this bore. A cylindrical in-line filter 64 is insertingly disposed within the discharge passage 63 and has, in its outer surface, an annular shoulder which is sealingly engageable with an annular step formed in the inner circumference of the bore at a location adjacent to the inner end of the bore. The in-line filter 64 is biased to move inwardly for engagement of the shoulder thereon with the annular step by a coil spring 66 which is received at its base end by a threaded plug 65 for closing an outer end opening of the bore. As the filter 64 becomes choked with foreign matter removed thereby, pressure differential across the filter will increase. It is designed that, when pressure differential across the filter 64 has reached a predetermined value, such a pressure differential causes the filter to move against the biasing force of spring 66 and to thereby move the annular shoulder thereon apart from the annular step in the inner circumference of the bore so that the oil inlet port 62P is communicated directly to the discharge passage 63. As can be appreciated now, the in-line filter 64 is supported such that it is operable when choked, also as a by-pass valve for directly connecting between the discharge passage 63 and the oil inlet port 62P. Owing to this by-pass valve function of the in-line filter 64, shortage or interruption of the oil supply to the control valve assembly 55 and, therefore, to the oil-operated clutches 43F and 43R is not caused even at a choked condition of the filter 64. Further, an overload which may be applied to the oil pump 48 at a choked condition of the filter is well avoided.

Figure 9:
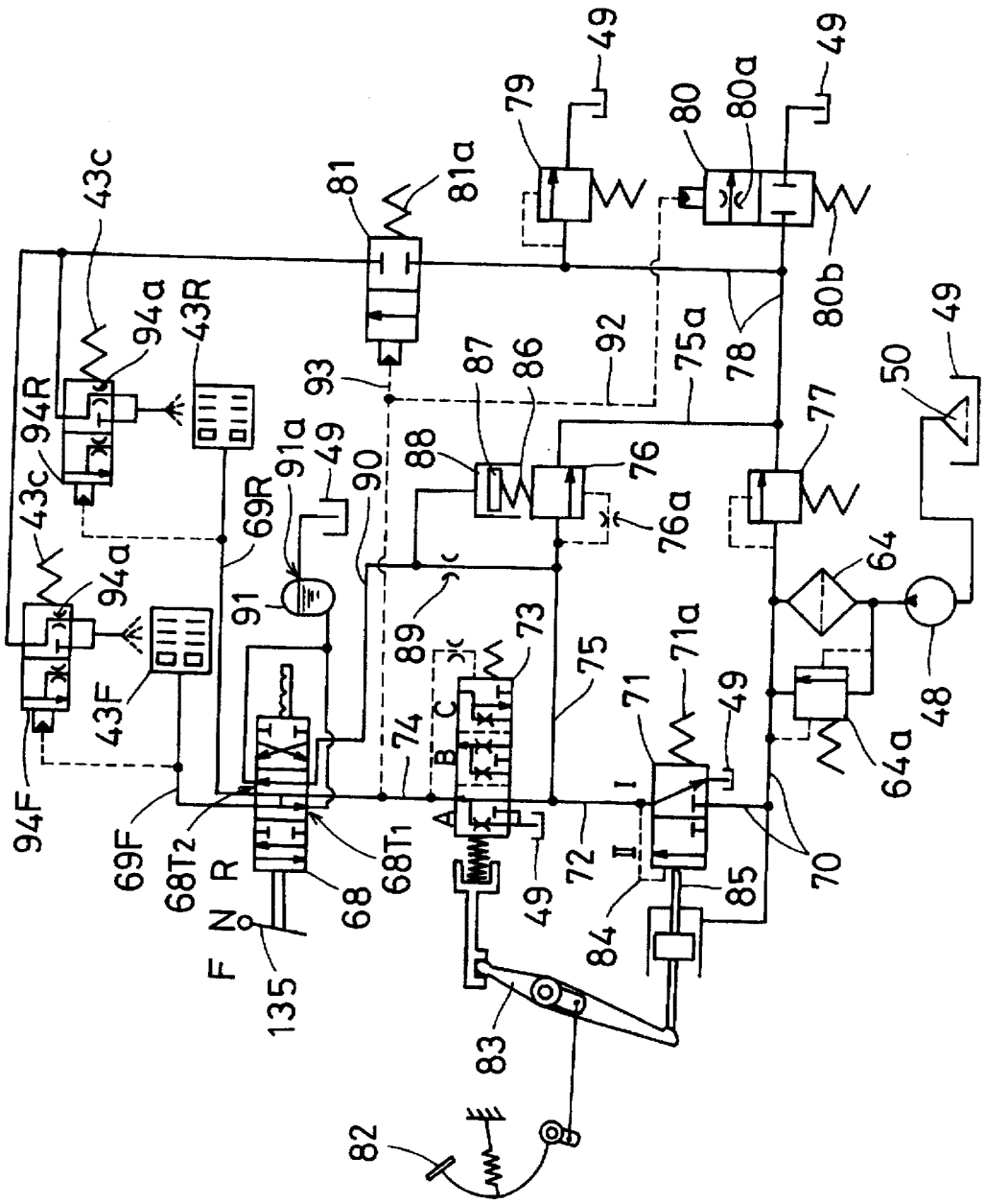
FIG. 9 is a circuit diagram illustrating oil circuits employed in the tractor shown.

The control valve assembly 55 will be outlined by referring to the fluid circuit diagram shown in FIG. 9. Valve assembly 55 includes a directional control valve 68 which is connected to the oil-operated clutches 43F and 43R through fluid paths 69F and 69R which correspond respectively to the operating oil passages 47F, 45F and 47R, 45R set forth above. This directional control valve 68 has a neutral position N in which both of the clutches 43F and 43R are disengaged, a forward directional position F in which clutch 43F is selectively operated, and a backward directional position R in which clutch 43R is selectively operated. A shut-oil valve 71 is connected to an output path 70 of the oil pump 48. Tile by-pass valve function of the in-line filter 64 is illustrated in FIG. 9 as a by-pass valve 64a which is in a parallel connection with the filter 64. Shut-off valve 71 is connected to a pressure-reducing valve 73 through a fluid path 72. Reducing valve 73 is connected to the directional control valve 68 through a fluid path 74. A fluid path 75 is branched from the path 72 and includes a modulating relief valve 76 for gradually establishing oil pressure to be applied to each of the clutches 43F and 43R. A main relief valve 77 is provided for establishing oil pressure in the pump-outlet path 70. Fluid-drain path 78 from this main relief valve 77 is directed toward the clutches 43F and 43R and is used for supplying lubricant oil to the discs 43a and 43b of these clutches. Fluid-drain path 75a from the modulating relief valve 76 is connected to the path 78. A secondary relief valve 79 is connected to the path 78 for establishing lubricant pressure. Further, a flow control valve 80 is connected to this path 78 and an on-off valve 81 is incorporated in this path 78.

As shown in FIG. 9, the pressure-reducing valve 73 is designed such that it is operated to displace by a pedal 82 through a rockable arm 83. This reducing valve 73 has a non-reducing position A m which fluid path 72 is connected to fluid path 74 without any substantial reduction in oil pressure, a pressure-reducing position B in which an internal fluid path for connecting between the fluid paths 72 and 74 is throttled and a part of the oil is drained into the oil sump 49 through an orifice so that oil pressure established by the modulating relief valve 76 is variably reduced, and a pressure-unloading position C in which fluid path 72 is blocked and fluid path 74 is connected to sump 49 so that clutches 43F and 43R are disengaged. The shut-off valve 71 is designed to have a shut-off position I in which fluid path 70 is blocked and fluid path 72 is connected to sump 49, and an open position II in which fluid path 70 is connected to fluid path 72. This shut-off valve 71 is biased to move to the shut-off position I by its valve spring 71a. An oil pressure-applying path 84 is provided for applying oil pressure in the fluid path 72 to the shut-off valve 71 from the opposite side of valve spring 71a. It is designed that when the reducing valve 73 is displaced to its pressure-unloading position C the shut-off valve 71 is displaced from its shut-off position I to its open position C by a rod member 85 which is operated by the rockable arm 83 set forth above, and that this valve 71 is then kept in its open position II by oil pressure in the fluid path 72 which is applied through the path 84.

As is usual, the modulating relief valve 76 includes a control piston 87 for receiving the base end of a pressure-establishing spring 86. Behind this control piston is defined an oil chamber 88 into which oil pressure in the fluid path 72 is applied gradually through an orifice 89 so that piston 87 is gradually advanced so as to gradually highten the force of spring 86 whereby oil pressure established in the fluid path 72 is gradually increased. For the purpose of draining oil quickly from the oil chamber 88 when the directional control valve 68 is returned to its neutral position N, chamber 88 is also connected to the control valve 68 through a fluid path 90 such that the chamber is connected to sump 49 through the valve 68 at the neutral position thereof.

Consequently, the directional control valve 68 includes two oil drain ports $68T_1$ and $68T_2$. Of these oil drain ports, drain port $68T_1$ is the one for draining oil from both of the oil-operated clutches 43F and 43R at the neutral position N of valve 68 and for draining oil from one of the clutches 43F or 43R at an operative position F or R of valve 68. The other oil drain port $68T_2$ is the one for draining oil from the oil chamber 88 of the modulating relief valve 76 at the neutral position N of the directional control valve 68. An oil reservoir chamber 91, which will be fully described later, is provided and has an overflow opening 91a which is arranged such that oil level in the reservoir chamber 91 is kept higher than the oil level in the oil sump 49. The above-referenced two oil drain ports $68T_1$ and $68T_2$ are communicated into the oil reservoir chamber 91 at a lower portion of the reservoir chamber.

As also shown in FIG. 9, the flow control valve 80 is designed to have a first position in which it does not allow oil to be drained from the path 78, and a second position in which a portion of oil flowing through the path 78 is drained into sump 49 through an orifice 80a included in this valve 80. This flow control valve 80 is biased to move to the first position by its valve spring 80b, and a pilot fluid path 92 is provided for applying oil pressure in the fluid path 74 between the reducing valve 73 and directional control valve 68 to the flow control valve 80 from the opposite side of spring 80b. The on-off valve 81 is designed to have an 'off' position shown in which it blocks the path 78, and an 'on' position in which it allows lubricant oil to flow through the path 78. Similarly to the flow control valve 80, the on-off valve 81 is biased to move to the 'off' position by its valve spring 81a, and a pilot path 93 is provided for applying oil pressure in the fluid path 74 to this valve 81 from the opposite side of spring 81a. Consequently, these valves 80 and 81 operate to control the supply of lubricant oil to the clutches 43F and 43R in response to the oil pressure applied to the clutches, as will be fully detailed later.

In FIG. 9 characters 94F and 94R designate lubricant control valve mechanisms which are associated with the respective clutches 43F and 43R. Each valve mechanism 94F, 94R is designed to include, as its movable valve member, the piston 43d (FIG. 3) which is biased to move by the return spring 43c and to which oil pressure in the fluid path 69F, 69R is applied. Each valve mechanism 94F, 94R is operable to control the supply of lubricant oil to the clutch discs 43a and 43b (FIG. 3) such that lubricant oil is supplied only through an internal orifice 94a at the disengaged condition of each clutch 43F, 43R whereas lubricant oil is supplied without being throttled at the engaged condition of each clutch 43F, 43R. Lubricant control valve mechanism of this type is well known to the art as is disclosed in, for example, U.S. Pat. No. 3,913,616.

Of the valves set forth above by referring to FIG. 9, the directional control valve 68 and modulating relief valve 76 are disposed, as shown in FIGS. 5 and 6, within an outwardly extending casing portion 58a on an outer surface of the outer casing member 58. These valves 68 and 76 extend axially of the vehicle. As shown in FIG. 6, the shut-off valve 71, pressure-reducing valve 73, main relief valve 77, secondary relief valve 79, flow control valve 80 and on-off valve 81 are disposed within the inner casing member 59 such that these valves extend axially of the vehicle with the arrangement shown.

For forming the oil reservoir chamber 91 as well as essential oil passages in the control valve assembly 55, the plate member 56 and partition plate 57 of the valve casing are used. As shown in FIGS. 4 to 6 and in FIG. 8, plate member 56 includes recesses 70a, 72a, 74a, 95F, 95R, 95L and 96 which open at the side of the partition plate 57. The open ends of these recesses are sealingly covered by the partition plate 57. Recess 70a forms an essential part of the fluid path 70 shown in FIG. 9 and is connected, at its upper end, to the oil inlet port 62P, as shown in FIGS. 7 and 8. This recess 70a is communicated to the inside of the inner casing member 59 through two bores 70b and 70c, shown in FIGS. 7 and 8, in the plate member 56. Recess 72a forms an essential part of the fluid path 72 shown in FIG. 9 and is communicated to the inside of the inner casing member 59 through two bores 72b and 72c, shown in FIGS. 7 and 8, in the plate member 56. This recess 72a is further communicated to the inside of the outer casing member 58 through bores 72d and 72e in the partition plate 57. Recess 74a forms an essential part of the fluid path 74 shown in FIG. 9 and is communicated to the inside of the inner casing member 59 through three bores 74b, 74c and 74d, shown in FIGS. 7 and 8, in the plate member 56. This recess 74a is further communicated to the inside of the outer casing member 58 through a bore 74e in the partition plate 57.

As also shown in FIGS. 7 and g, recesses 95F and 95R are connected respectively, at their upper ends, to the operating oil outlet ports 62F and 62R and are communicated, at their lower ends, to the inside of the outer casing member 58 through bores 97F and 97R in the partition plate 57. Recess 95L is connected, at its upper end, to the lubricant outlet port 62L and is communicated, at its lower end, to the inside of the outer casing member 58 through a bore 97L in the partition plate 57.

Figure 10:
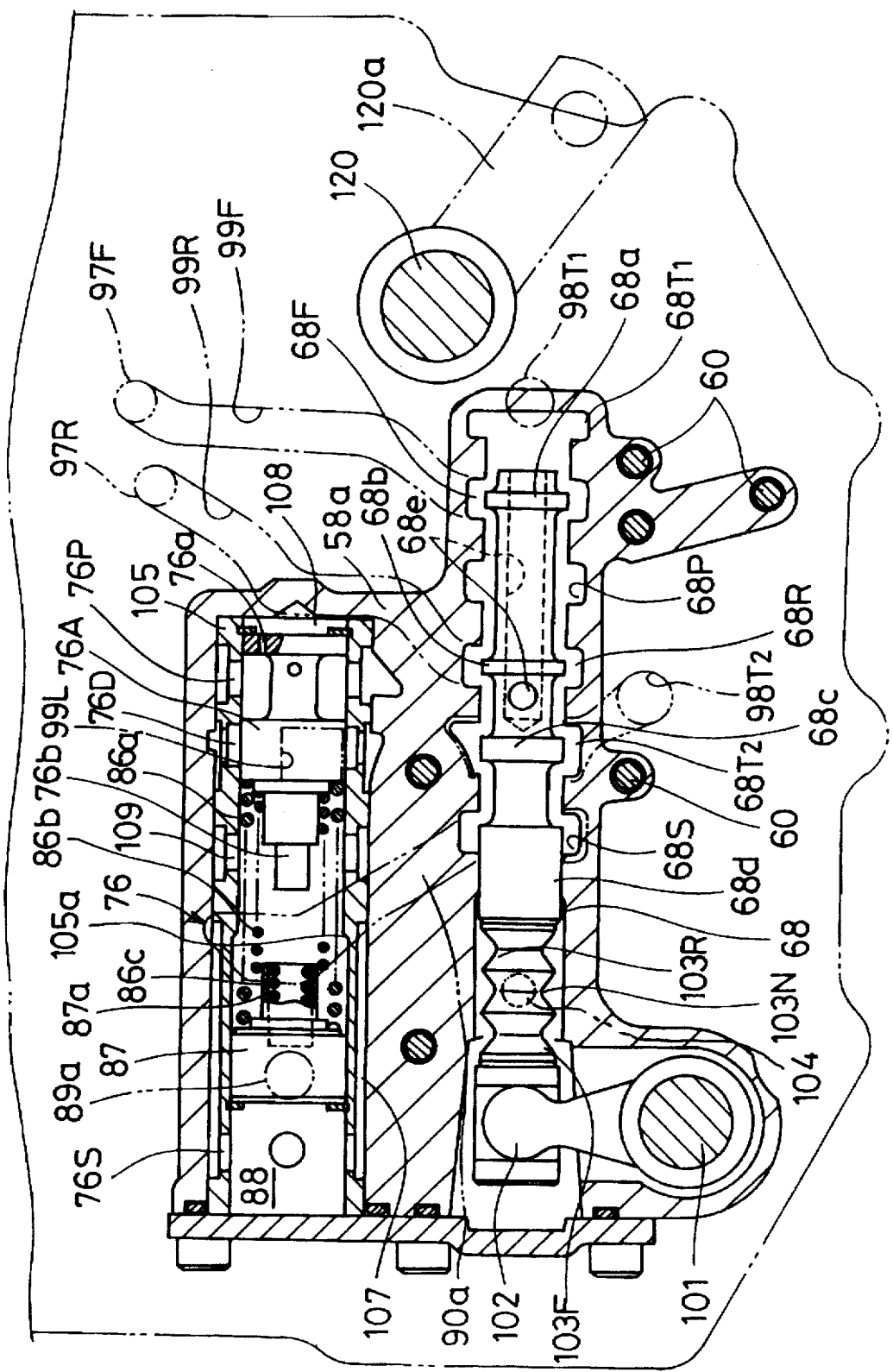
FIG. 10 is a sectional view taken generally along line X—X of FIG. 5.

Recess 96 is used for forming the oil reservoir chamber 91 and occupies a large area in the plate member 56, as can be seen from FIG. 8. As shown in FIGS. 5, 8 and 10, bores $98T_1$ and $98T_2$ are formed in the partition plate 57 for communicating the oil drain ports $68T_1$ and $68T_2$ of the directional control valve 68, set forth above by referring to FIG. 9, to lower locations within the recess 96. As shown in FIGS. 5, 7, 8 and 10, the overflow opening 91a is formed in the plate member 56 at a location adjacent to the uppermost end of the recess 96 such that the oil reservoir chamber 91 is communicated directly to the interior of the front housing 1 at a location before the inner casing member 59. The level of the overflow opening 91a is determined such that the oil level OLb in the reservoir chamber 91 is maintained considerably higher than the oil level OL in the oil sump 49, as shown.

Valve structures in the casing portion 58a of the outer casing member 58 will be detailed by referring to FIG. 10. The directional control valve 68 comprises a spool which extends axially of the vehicle. Valve 68 includes a pump port 68P which is communicated to the bore 74e shown in FIG. 8, clutch ports 68F and 68R which are communicated respectively to the bores 97F and 97R shown in FIG. 8 through oil passage grooves 99F and 99R in the outer casing member 58, an oil return port 68S which is communicated to the oil chamber 88 of the modulating relief valve 76 through an oil passage groove 90a (which corresponds to the fluid path 90 shown in FIG. 9), and two oil drain ports $68T_1$ and $68T_2$ which are communicated to the bores $98T_1$ and $98T_2$, as described above. The valve spool includes four lands 68a, 68b, 68c and 68d and an internal oil passage 68e. These lands and passage are arranged such that, at the neutral position N of valve 68 shown in FIG. 10, the pump port 68P and clutch ports 68F and 68R are connected to the oil drain port $68T_1$ whereas the oil return port 68S is connected to the oil dram port $68T_2$. At the forward directional position F to which valve 68 is placed by a forward (rightward, as viewed in FIG. 10) displacement of the spool from the neutral position shown, the pump port 68P and clutch port 68F are connected to each other at a location between lands 68a and 68b, the clutch port 68R and oil drain port $68T_1$ are connected to each other through the internal oil passage 68e, and the oil return port 68S is blocked by land 68d. At the backward directional position R to which valve 68 is placed by a rearward (leftward, as viewed in FIG. 10) displacement of the spool from the neutral position shown, the pump port 68P and clutch port 68R are connected to each other at a location between lands 68a and 68b, the clutch port 68F and oil drain port $68T_1$ are connected to each other at a location before land 68a, and the oil return port 68S is blocked at a location between lands 68c and 68d.

For operating or displacing the directional control valve 68, a laterally extending control shaft 101 is rotatably supported by the casing portion 58a and carries a shifter 102 which engages the valve spool. For retaining the valve 68 releasably at each of the positions N, F and R, the valve spool has, in its outer circumference, three annular latching grooves 103N, 103F and 103R into which a latching ball 104 disposed within a bore in the casing portion 58a projects selectively under the biasing of a spring (not shown). As shown in FIGS. 5 and 6, control shaft 101 extends outwardly of the casing portion 58a and has, at its outer end, an operating arm 101a attached thereto.

As shown in FIG. 10, the modulating relief valve 76 is disposed within a valve casing 105 which is fittingly disposed within the casing portion 58a at a location above the directional control valve 68. Casing 105 includes a pump port 76P which is communicated to the bore 72e shown in FIG. 8, an oil relief port 76D which is communicated to the inside of the inner casing member 59 through a groove 99L in the outer casing member 58 and through two lubricant passage bores 106a and 106b in the partition plate 57 and plate member 56 shown in FIGS. 7 and 8, and an oil inlet port 76S through which an elongated annular groove 107 in the outer circumference of the casing 105 is communicated to the oil chamber 88. As shown in FIG. 6, the annular groove 107 is communicated to the bore 72d in the partition plate 57 through a bore in which a tubular member 89a including therein the orifice 89, set forth above by referring to FIG. 9, is fittingly inserted. Bore 72d in turn is communicated to the recess 72a in the casing member 56. The annular groove 107 is also communicated to the oil return port 68S of the directional control valve 68 through the groove 90a, as shown in FIG. 10.

Within the valve casing 105, valve body 76A of the modulating relief valve 76 and the control piston 87 are slidably disposed in an axially spaced relationship. An oil pressure-applying chamber 108 is defined within the casing 105 at the opposite side of the control piston 87 and is communicated to the pump port 76P through a throttled oil passage 76a in the valve body 76A. Valve body 76A has an integral pin-shaped portion 76b which extends toward the control piston 87. Control piston 87 has, at its front face, an integral tubular portion 87a into which the pin-shaped portion 76b can project. Casing 105 includes, in its inner circumference, an annular step 105a for limiting the advance movement of piston 87.

The oil pressure-establishing spring 86 set forth above by referring to FIG. 9 is composed of three co-axial coil springs 86a, 86b and 86c. Of these springs, the outermost spring 86a is arranged such that it engages, at its one and the other ends, both of the valve body 76A and control piston 87 already at the condition shown in FIG. 10 where these valve body and control piston are spaced from each other to the maximum extent. The radially intermediate spring 86b is arranged such that one end of it engages valve body 76A and the other end is guided by the tubular portion 87a and is spaced from the control piston 87 such that spring 86b becomes engaged with piston 87 when the piston is advanced by some amount from the position shown in FIG. 10. The innermost spring 86c is disposed within the tubular portion 87a such that it becomes engaged with the pin-shaped portion 76b when this portion 76b has projected into the tubular portion 87a due to an advance movement of the control piston 87.

The modulating relief valve 76 shown varies the mode of increasing oil pressure, as from the time when the directional control valve 68 has been displaced from its neutral position N to the forward or backward directional position F or R so that the valve body 76A starts its oil-relief operation from the pump port 76P to the oil relief port 76D, in three stages. In the oil pressure-establising process, the control piston 87 is gradually advanced by oil supplied gradually into the oil chamber 88 through the orifice 89, groove 107 and port 76S. In a first stage, the valve body 76A is biased only by the outermost spring 26a so that the oil pressure is gradually hightened at a relatively low first rate. In a second stage where the valve body 76A is biased by the outermost and intermediate springs 86a and 86b, the oil pressure is gradually hightened at a second rate larger than the first rate. In a third stage where the valve body 76A is biased also by the innermost spring 86c, the oil pressure is hightened at a relatively high third rate to a normal oil pressure which is established at a condition where the control piston 87 is in engagement with the annular step 105a of valve casing 107.

Casing 107 further includes a breather port 109 which opens at the internal space between the valve body 76A and the control piston 87. This breather port 109 is communicated to a breathing bore 112 (FIG. 11) in the inner casing member 59 through a bore 110 (FIGS. 7 and 8) in the partition plate 57 and through a groove 111 and bore 111a (FIGS. 7 and 2) in the plate member 56. As shown in FIGS. 7 and 2, the plate member 56 further includes a breathing bore 113 for communicating a space above the oil reservior chamber 91 to the interior of the front housing 1.

Figure 11:
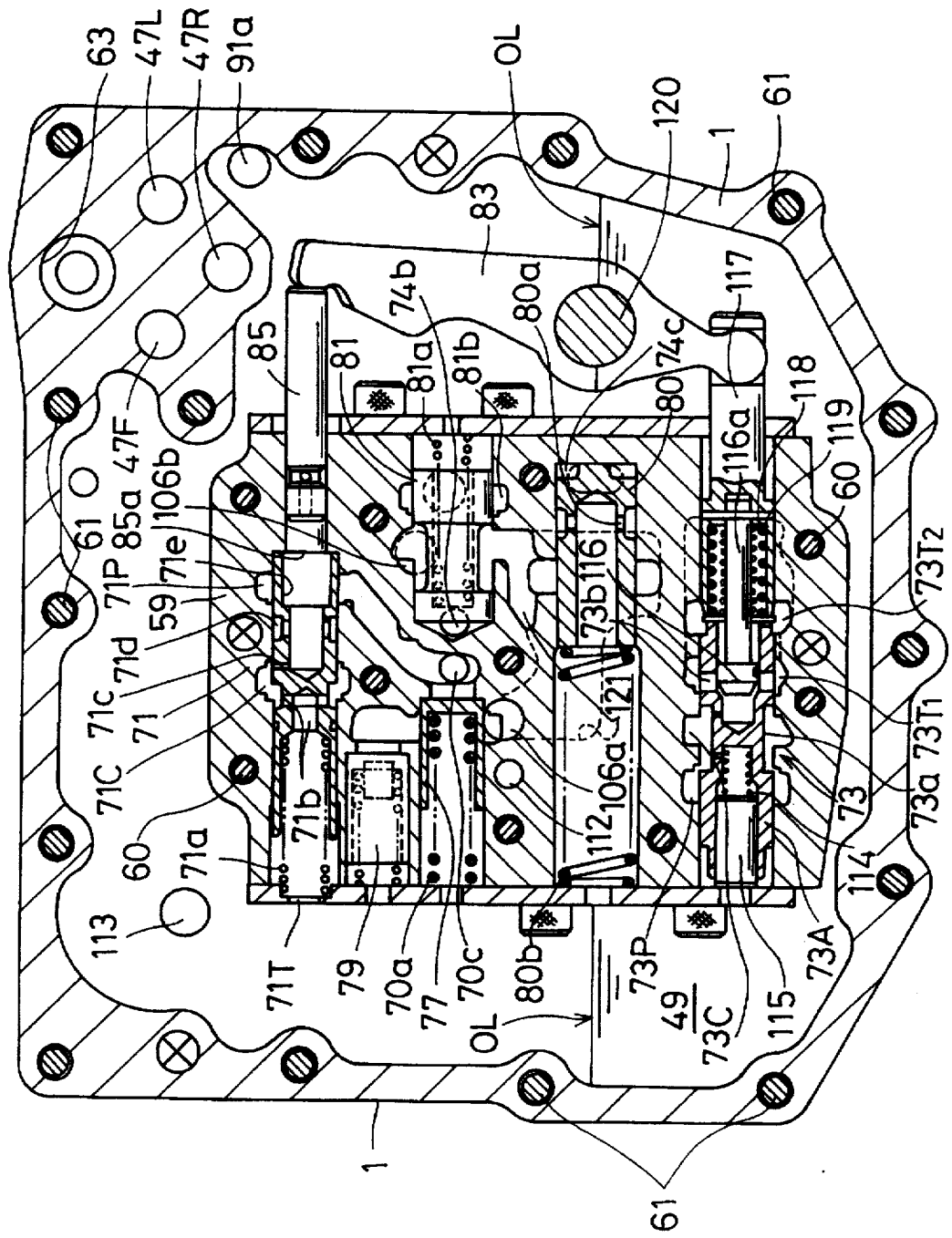
FIG. 11 is a sectional view taken generally along line XI—XI of FIG. 5.

Valve structures in the inner casing member 59 will be detailed by referring to FIG. 11. The pressure-reducing valve 73 comprises a valve body 73A which is slidably disposed within an axial valve-receiving bore formed in the inner casing member 59 at a lower portion thereof. At the valve-receiving bore, there open respectively a pump port 73P which is communicated to the bore 72c shown in FIGS. 7 and 8, a clutch port 73C which is communicated to the bore 74d shown in FIGS. 7 and 8, and two oil drain ports 73T$_1$ and 73T$_2$ which are communicated respectively to sump 49. Valve body 73A is shaped hollow and includes, at an axial mid portion thereof, an internal partition wall. A spring 114 and load piston 115 are disposed within the valve body and behind the internal partition wall, while a poppet 116 is disposed within the valve body and before the internal partition wall. Poppet 116 has a stem 116a which is secured to a control rod 117, using a pin 118, which in turn is slidably inserted into a front end portion of the valve-receiving bore and is engaged with the above-referenced rockable arm 83. Control rod 117 includes, in its rear half, an axial bore within which a spring element 119 composed of inner and outer coil springs is disposed and is adapted to bias the valve body 73A to move rearwardly. Valve body 73A further includes a pair of radial orifices, which are located respectively before and behind the internal partition wall, for leading oil pressure in the clutch port 73C into the two hollow spaces, isolated from each other by the internal partition wall, within the valve body, and a radial bore 73b for communicating the hollow space before the internal partition wall to the oil drain port 73T$_1$. Popper 116 is adapted to variably control the opening area ratio or flow area of the bore 73b.

Pressure-reducing valve 73 is shown in FIG. 11 at its non-reducing position A, set forth above by referring to FIG. 9, where an axially mid diameter-reduced portion 73a of the valve body 75A permits an unrestricted fluid communication between the pump port 73P and the clutch port 75C. Valve 73 is adapted to be displaced from the non-reducing position A to the pressure-reducing position B and, then, to the pressure-unloading position C by treading down the pedal 82 shown in FIG. 9 to slide the control rod 117 forwardly (rightwardly, as viewed in FIG. 11). In the pressure-unloading position C which is attained by treading down the pedal 82 fully so as to displace the control rod 121 fowardly fully, the biasing force of spring element 119 is largely reduced so that valve body 73A is displaced by the biasing force of spring 114 to a position in which the clutch port 73C is communicated to the oil drain port 73T$_1$ through a space around the diameter-reduced portion 73a. In the pressure-reducing position B which is attained by controlling the operation of pedal 82 so as to control the amount of displacement of the control rod 117, the valve body 73A operates to oscillatingly permit and interrupt the fluid communication between the pump port 73P and clutch port 73C at a land portion behind the diameter-reduced portion 73a while to drain oil from the clutch port 73C to the drain port 73T$_1$ at a throttled rate so that a reduced oil pressure lower than the oil pressure established by the modulating relief valve 76 is obtained in the clutch port 73C. The reduction degree in oil pressure can be varied by adjusting the amount of displacement of the control rod 117 and to thereby adjust the biasing force of spring element 119 applied to the valve body.

The shut-off valve 71 is slidably disposed within an axial valve-receiving bore which is formed in the inner casing member 59 at an upper portion thereof. There open at this bore a pump port 71P and clutch port 71C which are communicated respectively to the bore 70b and to the bore 72b shown in FIGS. 7 and 8. Valve 71 is biased by its valve spring 71a to move toward a direction of blocking between the ports 71P and 71C. Cover plate which is secured to the rear surface of the casing member 59 includes an oil drain port 71T and receives the base end of spring 71a. Valve 71 includes an oil passage bore 71b for communicating the clutch port 71C to the drain port 71T at the shut-off position I shown. Valve 71 further includes a radial orifice 71c for applying oil pressure in the clutch port 71C to this valve 71 from the opposite side of valve spring 71a. Furthermore, valve 71 includes a radial passage bore 71d for communicating between ports 71P and 71C at the open position II set forth above by referring to FIG. 9. The rod member 85 also set forth above by referring to FIG. 9 is slidably inserted into a small-sized bore, connected to the front end of the valve-receiving bore, and has a rear end face 85a which is operable to push an internal annular shoulder 71e of the valve 71 so as to move this valve rearwardly against the biasing force of valve spring 71a. The oil drain port 71T of valve 71 is disposed at a level lower than that of the overflow opening 91a of the oil reservoir chamber 91 such that the shut-off valve 71 is also located below the oil level in the oil reservoir chamber.

As already described, when the pressure-reducing valve 73 is displaced to its pressure-unloading position C, the shut-off valve 71 is pushed by the rod member 85 and is displaced to its open position II where bore 71d opens at the clutch port 71C and the blocking of pump port 71P is released so that ports 71P and 71C are communicated to each other through the hollow space within valve 71 and through bore 71d. Even When the reducing valve 73 is then returned to its non-reducing position A and, as a result, the rod member 85 is displaced by the action of oil pressure in the hollow space within valve 73 outwardly so as to keep engagement with the rockable arm 83, the shut-off valve 71 remains in its open position II against the biasing force of spring 71a due to the oil pressure in the clutch port 71C which pressure is applied to the valve 71 through bore 71d.

As described above with respect to FIG. 1, the primary shaft 7 is adapted to be driven directly by engine 5 without a clutch therebetween. This is because the shut-oil valve 71 and pressure-reducing valve 73 set forth above are provided, so that the additional change mechanism 12 shown in FIGS. 1 and 3 is operable as a clutch for the vehicle drive-power transmission line. That is, the shut-off valve 71 remains in its shut-off position I shown in FIGS. 9 and 11, even when the directional control valve 68 is displaced to its forward or backward directional position F or R, and is firstly displaced to its open position II when pedal 82 shown in FIG. 9 is trodden down fully so that the pressure-reducing valve 73 is displaced to its pressure-unloading position C. And the oil-operated clutch 43F or 43R is not engaged at the unloading position C of reducing valve 83 due to the unloading of oil pressure so that the additional speed change mechanism 12 functions as a clutch. The change mechanism 12 then starts transmitting power gradually as the pedal 82 is gradually released to return the reducing valve 73 gradually to its non-reducing position A via the pressure-reducing position B. As shown in FIG. 11, the rockable arm 83 for operating the reducing valve 73 and shut-off valve 71 is fixedly mounted on a rotatable control shaft 120 which is disposed the front of the inner casing member 59. This control shaft 120 extends laterally outwardly through the plate member 56, partition plate 57 and outer casing member 58 and has, at its outer end, an arm 120a attached thereto, as shown in FIG. 10.

As shown in FIG. 11, the main relief valve 77 is arranged within the inner casing member 59 such that it faces to the bore 70c which is communicated to the groove 70a shown in FIG. 8. The secondary relief 79 is arranged within the casing member 59 at a location above the main relief valve 77. Casing member 59 includes an oil passage groove 121 for directing oil from the relief port of main relief valve 77 toward the flow control valve 80 and on-off valve 81 of the arrangement shown. The lubricant passage bores 106a and 106b are communicated to the groove 121.

The flow control valve 80 includes a small-sized radial bore, constituting the orifice 80a set forth above, for draining a portion of oil from the groove 121 into the sump 49 and is biased by its valve spring 80b to move toward the direction of blocking the orifice 80a. At an oil chamber defined in front of valve 80, there opens the bore 74c shown in FIG. 7 which corresponds to the pilot path 92 shown in FIG. 9. The on-off valve 81 is designed such that it is operable to selectively permit and interrupt the fluid communication between the groove 121 and a lubricant output port 81b at which the bore 97L shown in FIGS. 7 and 8 opens. Valve 81 is biased by its valve spring 81a to move toward the direction of interrupting the fluid communication between the groove 121 and port 81b. At an oil chamber defined behind valve 81, there opens the bore 74b shown in FIGS. 7 and 8 which corresponds to the pilot path 93 shown in FIG. 9.

The flow control valve 80 and on-off valve 81, which control the supply of lubricant to the oil-operated clutches 43F and 43R in response to the clutch-operating oil pressure established in the fluid path 74 shown in FIG. 9, are designed as follows: First, the load or strength of valve spring 81a of the on-off valve 81 is predetermined such that the valve 81 is displaced from its 'off' position to its 'on' position to open the lubricant supply path 78 when oil pressure of a value which causes a slipping engagement of the clutch 43F or 43R is established in the path 74 during a pressure-establishing process by means of the modulating relief valve 76 or during a pressure-reducing operation by means of the reducing valve 73. Consequently, lubricant is supplied to the clutch of a slippingly engaged condition so that generation of heat due to the slipping engagement of the frictional elements 43a and 43b and wear of these elements resulting therefrom are depressed. In the neutral condition where no oil pressure is established in the path 74, lubricant is not supplied to the clutches 43F and 43R so that co-rotation of the frictional elements 43a and 43b due to the drag effect of viscous lubricant oil is not caused whereby an unexpected start of the vehicle is prevented with certainty. On the other hand, the load or strength of valve spring 80b of the flow control valve 80 is predetermined such that, when oil pressure in the path 74 has reached approximately to the normal oil pressure for operating tire clutch, the valve 80 is displaced from the position shown in FIG. 11 so that a portion of lubricant flow is drained from the lubricant supply path 78. The flow quantity of lubricant supplied to the clutch 43F or 43R of an engaged condition is reduced to such an extent enough to cool off residual heat from the slipping engagement of clutch. Consequently, during a normal operated condition of the clutch, loss of energy and generation of heat due to stirring of viscous lubricant oil by the co-rotating frictional elements 43a and 43b are largely reduced.

Figure 12:
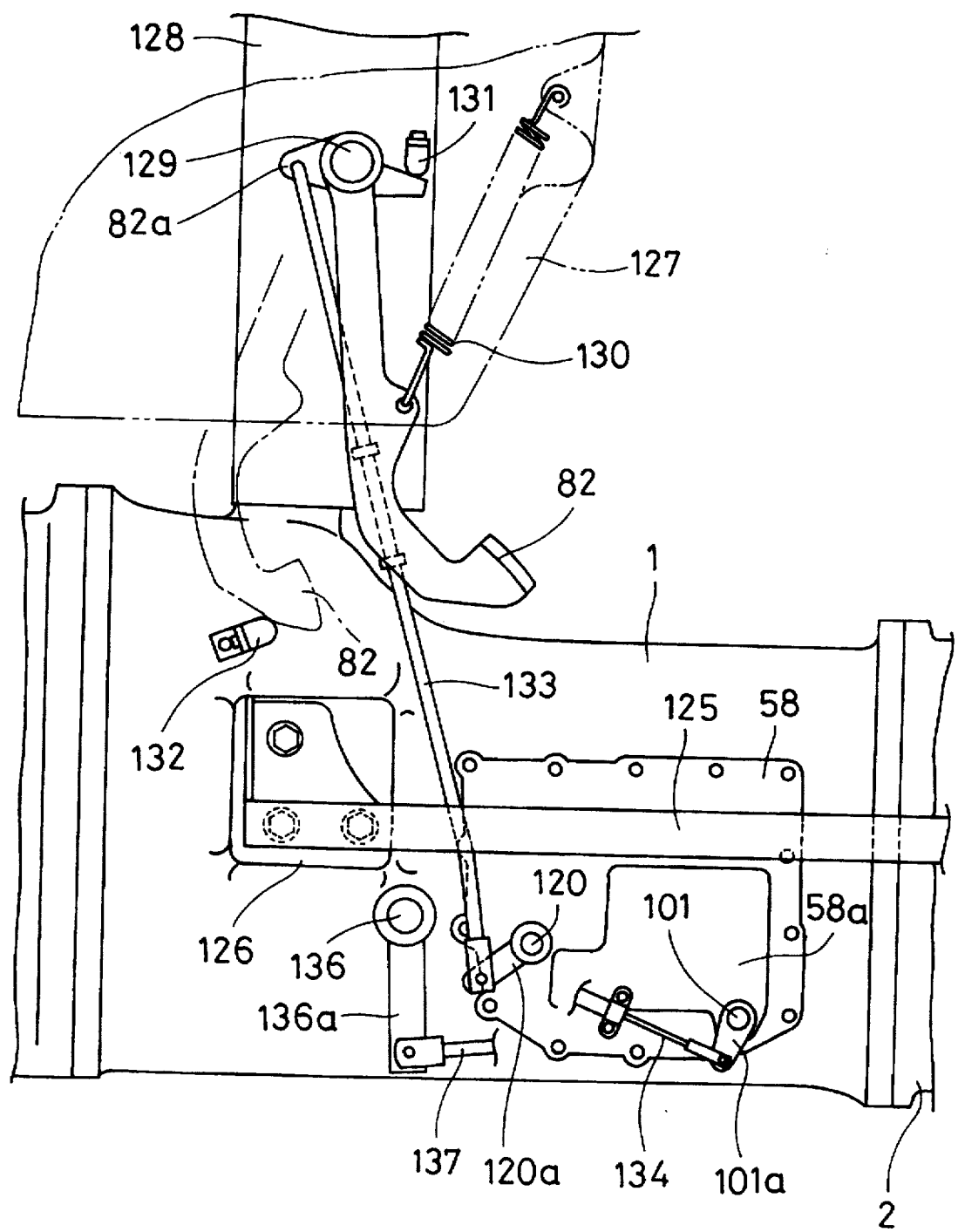
FIG. 12 is a side view showing an essential part of the front housing.

FIG. 12 illustrates a side view of an essential part of the front housing 1. As shown in this figure, a step 125 is arranged at an outer side of the outer casing member 58 with an interval therebetween and is fixedly secured to a mounting boss 126 on a side surface of the front housing 1 and to another mounting boss (not shown) on an outer surface on the transmission casing 2. The casing portion 58a is located under the step 125, and the above-referenced operating arms 101a and 120a are also located under the step 125. A column 128 is arranged at an inner side of an engine bonnet 127 and is fixedly mounted on an upper surface of the front housing 1. The pedal 82 for operating the pressure-reducing valve is supported rotatably about a support shaft 129 by the column 128. A return spring 130 for the pedal 82 is disposed between this pedal and the bonnet 127. A pair of stops 131 and 132 for limiting the movement of pedal 82 are fixedly disposed on a side surface of the column 128 and on a side surface of the front housing 1. Arm 120a on the control shaft 120 for operating the pressure-reducing valve is connected through a rod 133 to an arm 82a which is co-rotatable with pedal 82. Arm 101a on tire control shaft 101 for operating the directional control valve is connected through a control cable 134 to a shifter lever 135 which is disposed, as shown in FIG. 2, at one side of the steering wheel 30. In FIG. 12, character 136 designates a rotatable control shaft for operating the power take-off clutch 8 shown in FIG. 1. An operating arm 136a is attached to the control shaft 136 and is operatively connected to a power take-off clutch lever (not shown) through a rod 137.

The primary speed change mechanism 15 and auxiliary speed change mechanism 18 shown in FIG. 1 will be outlined. The primary change mechanism 15 includes four gears 141, 142, 143 and 144 which are rotatably mounted on the drive shaft 13, and four gears 145, 146, 147 and 148 which are fixedly mounted on the change shaft 14 and are meshed respectively with the gears 141–144 on the drive shaft. Two double-acting synchronizer clutches 149 and 150 are mounted on the drive shaft 13 for selectively coupling gears 141–144 one at a time to the drive shaft. Consequently, this change mechanism 15 is operable to provide first to fourth change ratios.

As also shown in FIG. 1, the change shaft 14 is drivingly connected to the intermediate shaft 16 through a reduction gearing of meshing gears 152 and 153. Two changing gears 154 and 155 are fixedly mounted on the intermediate shaft 16, and two shift gears 156 and 157 meshable respectively with gears 154 and 155 are slidably but non-rotatably mounted on the propeller shaft 17. A clutch 158 which can be engaged by displacing the shift gear 157 is disposed between the change shaft 14 and propeller shaft 17. Consequently, the auxiliary change mechanism 18 is operable to provide first to third change ratios by operating shift gears 156 and 157.

Figure 13:
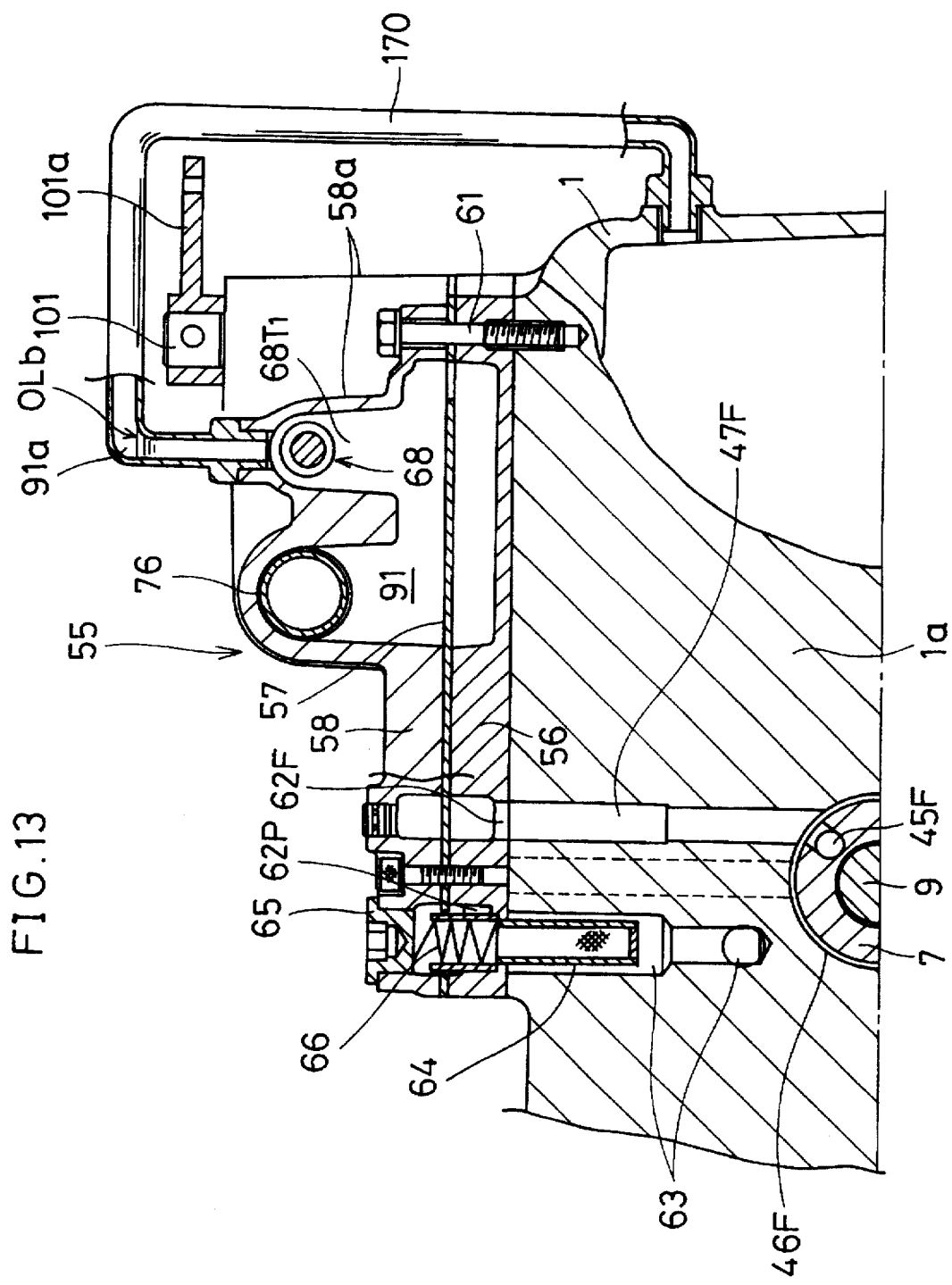
FIG. 13 is a sectional front view of a part of a tractor in which a second embodiment of the oil supply system according to the present invention is employed.

FIG. 13 depicts a second embodiment in which a control valve assembly 55 is fixedly mounted on an upper surface of the front housing 1. This valve assembly 55 has a simplified structure in which the inner casing member 59 and valves 71, 73, 77, 79, 80 and 81 housed therein in the first embodiment are omitted and only a directional control valve 68 and modulating relief valve 76 are provided.

In the second embodiment, an oil reservoir chamber 91 is defined in a casing portion 58a of the outer casing member 58, in which the directional control valve 68 and modulating relief valve 76 are housed, and is communicated to the oil drain port 68T$_1$ and 68T$_2$ (port 68T$_2$ is not shown) of valve 68. A pipe 170 is secured, at one end thereof, to a top wall of the casing portion 58a and opens at the reservoir chamber 91. Pipe 170 extends from its one end upwardly, then laterally outwardly, then downwardly, and then laterally inwardly and is secured, at the other end, to a sidewall of the front housing 1 such that the pipe opens at the interior of housing 1 at a location behind the partition wall 1a and at a level above the oil level (not shown) in the housing 1. Thus, an overflow opening 91a is provided within the pipe 170 by an upper end of its upstanding portion of one end, as shown. The other parts are similar to the corresponding parts of the first embodiment and are designated by like characters.

In the embodiments having been detailed hereinbefore, drainage of oil from the oil chamber 88 of the modulating relief valve 76 is controlled by the directional control valve 68 for controlling the supply of operating oil to the oil-operated clutches 43F and 43R. However, a control valve other than the directional control valve 68 may be employed for controlling the drainage of oil from the chamber 88. Further, although examples have been shown in which the present invention is applied to an oil supply system for supplying oil to plural clutches 43F and 43R of an oil-operated speed change mechanism for changing the vehicle speed, the invention can also be practiced as a system for supplying oil to another oil-operated means employed in working vehicles, such as another oil-operated clutch, hydraulic cylinder, oil-operated brake or the like. Therefore, the present invention is to be limited only by the proper scope or fair meaning of the appended claims.

I claim:

1. In a working vehicle which comprises: a vehicle body, oil-operated means, an oil pump for supplying oil to said oil-operated means, and a control valve means for controlling the operation of said oil-operated means, a lower portion of the interior of said vehicle body being employed as an oil sump for reserving oil supplied to said oil-operated means by said oil pump, an oil supply system characterized in:

that an oil reservoir chamber (91) having an overflow opening (91a) is provided, said overflow opening being arranged such that the oil level in said oil reservoir chamber is kept higher than the oil level in said oil sump (49) due to the overflow of oil from said reservoir chamber into said oil sump through said overflow opening; and that an oil-drain port (68T$_1$; 68T$_2$) of said control valve means (68) is communicated into said oil reservoir chamber (91) at a level lower than said oil level in said oil reservoir chamber.

2. The oil supply system as set forth in claim 1, wherein said oil-operated means is at least one oil-operated clutch (43F, 43R), wherein a modulating relief valve (76) is provided for gradually increasing oil pressure applied to said oil-operated clutch, said relief valve comprising a control piston (87) which receives a base end of an oil pressure-establishing spring (86), and an oil chamber (88) which is defined at a location behind said control piston and is adapted to be supplied with clutch-operating oil through an orifice (89), and wherein said control valve means is a control valve (68) for selectively connecting said oil chamber (88) to said oil sump (49) and thereby draining oil quickly from said oil chamber.

3. The oil supply system as set forth in claim 1, wherein said oil-operated means is at least one oil-operated clutch (43F, 43R), and wherein said control valve means is a directional control valve (68) for controlling the supply of clutch-operating oil to said oil-operated clutch.

4. The oil supply system as set forth in claim 3, wherein a modulating relief valve (76) is provided for gradually increasing oil pressure applied to said oil-operated clutch (43F, 43R), said relief valve comprising a control piston (87) which receives a base end of an oil pressure-establishing spring (86), and an oil chamber (88) which is defined at a location behind said control piston and is adapted to be supplied with clutch-operating oil through an orifice (89), said directional control valve (68) being operable at its neutral position to connect said oil chamber (88) to said oil sump (49) for draining oil quickly from said oil chamber.

5. The oil supply system as set forth in claim 4, wherein a plurality of said oil-operated clutches (43F, 43R) are provided and are adapted to be operated selectively one at a time for a vehicle speed-change purpose.

6. The oil supply system as set forth in claim 1, wherein a valve casing (56, 57, 58, 59) for said control valve means (68) is fixedly supported by a housing (1) which constitutes a part of said vehicle body, and wherein said oil-reservoir chamber (91) is formed within said valve casing such that said overflow opening (91a) opens directly at the interior of said housing.

7. The oil supply system as set forth in claim 6, wherein said valve casing (56, 57, 58, 59) includes two casing members (56, 57) which are joined together such that said oil reservoir chamber (91) is defined between said two casing members.

* * * * *